United States Patent
Kuwahara

(10) Patent No.: US 12,530,202 B2
(45) Date of Patent: Jan. 20, 2026

(54) SYSTEM CONFIGURATION DERIVATION DEVICE, SYSTEM CONFIGURATION DERIVATION METHOD, AND PROGRAM

(71) Applicant: NEC Corporation, Tokyo (JP)

(72) Inventor: Takuya Kuwahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 18/588,186

(22) Filed: Feb. 27, 2024

(65) Prior Publication Data

US 2024/0303089 A1    Sep. 12, 2024

(30) Foreign Application Priority Data

Mar. 7, 2023    (JP) .................................. 2023-034356

(51) Int. Cl.
*G06F 9/445*    (2018.01)
(52) U.S. Cl.
CPC ................................ *G06F 9/44505* (2013.01)
(58) Field of Classification Search
CPC .................................................. G06F 9/44505
USPC ................................................................ 713/1
See application file for complete search history.

(56) References Cited

U.S. PATENT DOCUMENTS

| | | | | | |
|---|---|---|---|---|---|
| 5,257,368 | A | * | 10/1993 | Benson .................. | G06F 15/161 710/1 |
| 5,787,280 | A | * | 7/1998 | Joseph ...................... | G06F 8/71 707/999.203 |
| 6,185,678 | B1 | * | 2/2001 | Arbaugh ................ | G06F 21/575 726/5 |
| 6,978,259 | B1 | * | 12/2005 | Anderson .............. | G06F 3/0605 706/19 |
| 8,583,769 | B1 | * | 11/2013 | Peters .................... | H04L 63/104 709/221 |
| 2002/0016955 | A1 | * | 2/2002 | Matsuo ...................... | G06F 8/20 717/106 |
| 2008/0162107 | A1 | * | 7/2008 | Aniszczyk ........... | G06F 9/44505 703/21 |

(Continued)

FOREIGN PATENT DOCUMENTS

JP    6989014 B2    1/2022

OTHER PUBLICATIONS

Takayuki Kuroda, et al., "Weaver: A Novel Configuration Designer for IT/NW Services in Heterogeneous Environments", 2019 IEEE Global Communications Conference (GLOBECOM), 2019, pp. 1-6.

(Continued)

*Primary Examiner* — Paul R. Myers
(74) *Attorney, Agent, or Firm* — Sughrue Mion, LLC

(57) ABSTRACT

A system configuration derivation device takes as input concrete configurations of pre-transition system and a post-transition system, and outputs a structure feedback function that gives a higher rating to features possessed by the post-transition system candidate having a lower renewal cost; and takes as input functional requirements and a primary configuration, which is the concrete configuration expressing the configuration of the pre-transition system, and by repeating the concretization regarding the functional requirements, searches for the configuration in which the functional requirements are fully made concrete, and derives the concrete configuration with the lowest renewal cost by using the output structure feedback function.

6 Claims, 15 Drawing Sheets

(56) References Cited

U.S. PATENT DOCUMENTS

| | | | | |
|---|---|---|---|---|
| 2010/0332444 | A1* | 12/2010 | Akatsu | G06N 5/025 |
| | | | | 706/54 |
| 2015/0286488 | A1* | 10/2015 | Watanabe | G06F 9/44505 |
| | | | | 713/100 |
| 2017/0024203 | A1* | 1/2017 | Dayan | G06F 8/70 |
| 2021/0266218 | A1* | 8/2021 | Kuwahara | H04L 41/5009 |
| 2021/0306237 | A1* | 9/2021 | Yakuwa | G06F 8/20 |
| 2024/0202408 | A1* | 6/2024 | Yakuwa | G06F 30/27 |

OTHER PUBLICATIONS

T. Kuroda and A. Gokhale, "Model-based IT Change Management for Large System Definitions with State-related Dependencies," 2014 IEEE 18th International Enterprise Distributed Object Computing Conference, Ulm, 2014, pp. 170-179.

M. Nakanoya, et al., "Automated Change Planning for Differential Update IT Systems with State Constraint," 2016 IEEE 20th International Enterprise Distributed Object Computing Workshop (EDOCW), Vienna, 2016, pp. 1-9.

* cited by examiner

SYSTEM CONFIGURATION DERIVATION DEVICE, SYSTEM CONFIGURATION DERIVATION METHOD, AND PROGRAM

This application is based upon and claims the benefit of priority from Japanese patent application No. 2023-034356, filed Mar. 7, 2023, the disclose of which is incorporated herein in its entirety by reference.

TECHNICAL FIELD

The present invention relates to a system configuration derivation device, a system configuration derivation method, and a program for the purpose of renewal cost optimization.

BACKGROUND ART

When constructing an Information and Communication Technology (ICT) system for the purpose of service operation, etc., system configuration design work is required. The design work of system configuration involves constructing, without any deficiencies, the system components and their connection relationships (hereinafter referred to collectively as the "system configuration") required to meet the requirements of the desired system (hereinafter referred to as "system requirements"). Furthermore, it is essential to accurately set all setting items required for the entire system to operate correctly. This can be a very man-hour intensive process.

Automatic design technology is a technology that automates the above design process, i.e., the process of materializing system requirements into a system configuration. Although many existing automatic design technologies are based on restricting the problem to a specific domain of the ICT system, e.g., network routing or computation resource allocation, and then solving some kind of optimization problem, etc., for automatic design, research into techniques to meet generic requirement descriptions is ongoing. For example, Patent Document 1 (Japanese Patent No. 6989014) discloses a system configuration derivation device that can efficiently derive the configuration of a system.

Non-Patent Document 1 (Takayuki Kuroda, Takuya Kuwahara, Takashi Maruyama, Kozo Satoda, Hideyuki Shimonishi, Takao Osaki and Katsushi Matsuda, "Weaver: A Novel Configuration Designer for IT/NW Services in Heterogeneous Environments", 2019 IEEE Global Communications Conference (GLOBECOM), 2019, pp. 1-6.) describes a technique for automatically deriving a system configuration based on requirements described using a generic system configuration information model in a graph-like format. According to the technology described in Non-Patent Document 1, automatic design is possible with generic and multifaceted requirements as input by preparing the required models.

The requirements that can be described by the generic model described in Non-Patent Document 1 are mainly specified by a graph-like representation in which functions, devices, and other components are represented as nodes, and the relationships among the nodes are represented by edges (oriented edges) (hereinafter called an "abstract configuration"). For example, the requirement "Communication between two servers by Transmission Control Protocol (TCP) is possible" is expressed as an abstract configuration composed of nodes corresponding to each server connected by edges that express "TCP communication possible". The method described in Non-Patent Document 1 is a mechanism for automatically deriving a way to embody the abstract "TCP communication possible" edges contained in the aforementioned abstract configuration.

It is required to note that the automatic design method described in Non-Patent Document 1 does not embody the given requirements at once. In the automatic design method described above, rules for rewriting an abstract configuration into another abstract configuration that is one step more concrete (hereinafter referred to as "concretization rules") are kept as data, and this data is converted into concrete abstract configurations in stages by sequentially applying them to abstract configurations that represent requirements.

A concretization rule is data in which is described a method of transforming an abstract element included in an abstract configuration (hereafter referred to as a "unit requirement") into another more concrete component (hereafter this is referred to as "resolving" the unit requirement). Formally speaking, a concretization rule defines how to resolve a unit requirement by transforming an abstract configuration, and includes two pieces of data (called "left-hand side" and "right-hand side" respectively) that are graphs of the same form as the abstract configuration.

If the application of the concretization rule yields an abstract configuration in which all unit requirements in the requirement have been resolved, this abstract configuration can be considered to be a fully concretized system configuration (hereinafter simply referred to as a "concrete configuration") without any abstract elements.

In this way, automated design is made possible by the step-by-step concretization of system requirements. The aforementioned techniques can be applied to technologies that automate part of the operation and maintenance of a requirements-based ICT system after its construction.

The following section outlines the procedures for service operation with the application of automated design techniques.

First, the user (hereinafter referred to as "service operator") constructs the system requirements (hereinafter referred to as "requirements I(0)") for the desired ICT system. Based on these requirements, a system configuration that satisfies the requirements (hereinafter referred to as "system S(0)") can be generated by using automatic system design technology, and the service operator builds a system based on the output design and starts providing services.

If change requirements are required for the service being provided during the operation of the system S(0), the service operator does not change system S(0), but rather reflects the required requirement changes in requirements I(0), constructs the new requirements I(1), and again inputs them into the automatic system design device to obtain system S(1). This will allow the new system to accommodate changing requirements.

Also, if some failures occur during the operation of system S(1), the service operator reflects the response required to recover from the malfunction that occurred in requirements I(1), constructs the new requirements I(2), and inputs them again into the automatic system design device to obtain system S(2). This enables the application of automatic fault handling to the system.

Thereafter, whenever a circumstance arises that requires some change to the system in operation, the requirements can be changed and this can be input into the automatic design device to make the required changes to the system design.

The above is a description of a service operation that applies automated design techniques.

By operating and maintaining the system through the application of the system automatic design device as described above, the system operator can work on system changes through the system requirements rather than through the system in operation. This allows the benefits such as the "efficiency of design", "elimination of subjectivity" and "stabilization of quality" that system automatic operations have, to be enjoyed during the system operation phase.

Thus, according to the method described in Non-Patent Document 1, by maintaining models of required system configuration components and specifying system requirements as abstract configurations by combining them, automatic design can be performed by applying pre-defined concretization rules. Therefore, if there are appropriately defined system requirements, they can be utilized in the operation and maintenance phases of the aforementioned systems by repeating the process of changing the requirements and then redesigning them again.

However, even if there are no problems in each design process, there are problems that arise in the overall flow of system operation and maintenance. The following will deal with this issue, focusing on a one-step change in requirements. The system requirements before the focused change are called "primary requirements," the system requirements after the change are called "new requirements," the system configuration automatically designed based on the primary requirements is called the "primary configuration," and the system configuration automatically designed based on the new requirements is called the "new configuration".

According to the technology described in Non-Patent Document 1, the automatic design device described above outputs a system configuration found first in the design process among the designs that satisfy the requirements.

However, since many complex update procedures increase the likelihood of unexpected errors and failures during the process, and extended update times reduce service user satisfaction, when updating a system while it is in operation, the number of steps in the procedure and the time required for the update (collectively referred to below as "renewal cost") is often considered to be as minimal as possible. Therefore, in order to achieve system operation and maintenance through automatic design techniques, it is desirable for the automatic design engine to output a new configuration with as low a renewal cost from the primary configuration as possible.

However, it is difficult to output a new configuration that is more suitable for autonomous operation with general automatic system design techniques that cannot reflect the difficulty of renewal from the primary configuration in the mechanism.

The following will discuss the difficulty of calculating renewal costs during the design process, which is one of the main factors that make it difficult to output a new configuration with as low a renewal cost as possible from the primary configuration.

First, it is explained as a premise that the magnitude of temporal cost is not determined by the graph structure similarity. To this end, the following is a counterexample to the argument that "a configuration more similar to the primary configuration is less expensive to renew than a less similar configuration".

FIG. 18 illustrates how three different concrete configurations D402, D403, and D404 can be obtained by concretizing requirement 400, and the procedure for renewing the concrete configurations D402-D404 and primary configuration 401. The following items (1) through (4) are taken into account in the system renewal procedure shown in FIG. 18.

(1) A major update of application "a1" requires a machine setting update and restart. In this case, applications "a1", "a2" and "a3" are required to be terminated by a regular termination process.

(2) Since the servers used in the design are assumed to be on the same network as each other, the linkage between applications "a1", "a2" and "a3" works correctly by simply changing the destination settings. In other words, even if the application deployment location changes, no additional work, such as changing the network wiring, is required.

(3) Unused servers "m2" and "m3" are turned off in the primary configuration.

(4) During the update period, the service may be in a maintenance state and normal service provision may not be possible.

The concrete configuration most similar to the primary configuration 401 is considered to be D402, whose elements are completely identical except for the settings. On the other hand, D403, which requires one more server than the primary configuration, can be viewed as a less similar configuration.

However, in order to upgrade from the primary configuration 401 to D402, machine "m1" requires to be restarted when application "a1" is updated, and this restart requires stopping and restarting "a2" and "a3". Conversely, D403 does not trigger such additional work because the server is newly set up for "a1". As a result, the renewal procedure to D402 is larger than that to D403 (unless there are circumstances such as the startup cost of "m2" being significantly higher than that of "m1").

The above is an illustration of a counterexample to the argument that "a configuration more similar to the primary configuration is less expensive to renew than a less similar configuration".

Next will be explained the difficulty of estimating renewal costs in the mid-stage of the design process. As mentioned earlier, automatic design techniques that can accommodate generic requirements descriptions will concretize requirements step by step, but according to the counterexample described earlier, the estimated value of the renewal cost (or the rating score to move toward lower renewal cost) cannot be calculated by looking at the similarity between the abstract configuration in the middle of the design process (hereafter referred to as the "intermediate configuration") and the primary configuration.

On the other hand, since it is not possible to directly compare an intermediate configuration containing abstract elements with the primary configuration, it is difficult to compute the data equivalent to a renewal procedure in the same way that one would compute a normal renewal procedure.

Therefore, in order to calculate an estimate of renewal cost from an intermediate configuration, it is required to have a means of evaluating the renewal cost for the resulting concrete configuration from that intermediate configuration based on some feature that can be derived from the graph structure, other than graph similarity.

Hereafter, the aforementioned "evaluating renewal costs based on the structural characteristics of the graph" will be referred to as "structure feedback," and the function that performs structure feedback using the graph structure as input and returns an evaluation value will be referred to as the "structure feedback function". However, the output of the structure feedback function does not necessarily have to be the renewal cost value itself. It is desirable to discover the intermediate configuration that is expected to have a smaller renewal cost by comparing the evaluation value of the structure feedback function.

SUMMARY

Therefore, one of the purposes of this disclosure is to provide a system automatic design device, a system automatic design method, and a program that enable the design of redundant configurations that solve the above-mentioned problems.

According to one example aspect of the present disclosure, a system configuration derivation device including at least one memory configured to store instructions; and at least one processor configured to execute the instructions to, when an abstract configuration is intended to represent a configuration of a system containing undetermined portions using a graph structure that includes nodes corresponding to components constituting the system and edges indicating relationships among the components, concretization serves to transform the graph structure such that the undetermined portions of the abstract configuration are determined, and a concrete configuration is one in which all the undetermined portions included in the abstract configuration are determined by the concretization, take as input two of the concrete configurations respectively representing the pre-transition system, which is the system before transition, and a candidate of the post-transition system, which is the system after the transition, and output a structure feedback function that gives a higher rating to features based on the graph structure possessed by the post-transition system candidate having a lower renewal cost from the pre-transition system to the post-transition system candidate; and search for the concrete configuration in which functional requirements are fully made concrete by taking as input the functional requirements to be provided by the post-transition system expressed by the abstract configuration and a primary configuration, which is the concrete configuration expressing the configuration of the pre-transition system, and by repeating the concretization regarding the functional requirements, and derive the concrete configuration with the lowest renewal cost based on the primary configuration and the searched concrete configuration by using the output structure feedback function.

According to one example aspect of the present disclosure, a system configuration derivation method includes, when an abstract configuration is intended to represent a configuration of a system containing undetermined portions using a graph structure that includes nodes corresponding to components constituting the system and edges indicating relationships among the components, concretization serves to transform the graph structure such that the undetermined portions of the abstract configuration are determined, and a concrete configuration is one in which all the undetermined portions included in the abstract configuration are determined by the concretization, outputting a structure feedback function that gives a higher rating to features based on the graph structure possessed by the post-transition system candidate having a lower renewal cost from the pre-transition system to the post-transition system candidate, by taking as input two of the concrete configurations respectively representing the pre-transition system, which is the system before transition, and a candidate of the post-transition system, which is the system after the transition; and searching for the concrete configuration in which functional requirements are fully made concrete, by taking as input the functional requirements to be provided by the post-transition system expressed by the abstract configuration and a primary configuration, which is the concrete configuration expressing the configuration of the pre-transition system, and by repeating the concretization regarding the functional requirements, and deriving the concrete configuration with the lowest renewal cost based on the primary configuration and the searched concrete configuration by using the output structure feedback function.

According to one example aspect of the present disclosure, a program causes a computer to processes, when an abstract configuration is intended to represent a configuration of a system containing undetermined portions using a graph structure that includes nodes corresponding to components constituting the system and edges indicating relationships among the components, concretization serves to transform the graph structure such that the undetermined portions of the abstract configuration are determined, and a concrete configuration is one in which all the undetermined portions included in the abstract configuration are determined by the concretization. The processes includes outputting a structure feedback function that gives a higher rating to features based on the graph structure possessed by the post-transition system candidate having a lower renewal cost from the pre-transition system to the post-transition system candidate, by taking as input two of the concrete configurations respectively representing the pre-transition system, which is the system before transition, and a candidate of the post-transition system, which is the system after the transition; and searching for the concrete configuration in which functional requirements are fully made concrete, by taking as input the functional requirements to be provided by the post-transition system expressed by the abstract configuration and a primary configuration, which is the concrete configuration expressing the configuration of the pre-transition system, and, by repeating the concretization regarding the functional requirements, and deriving the concrete configuration with the lowest renewal cost based on the primary configuration and the searched concrete configuration by using the output structure feedback function.

EXAMPLE EMBODIMENT

Figure 1:
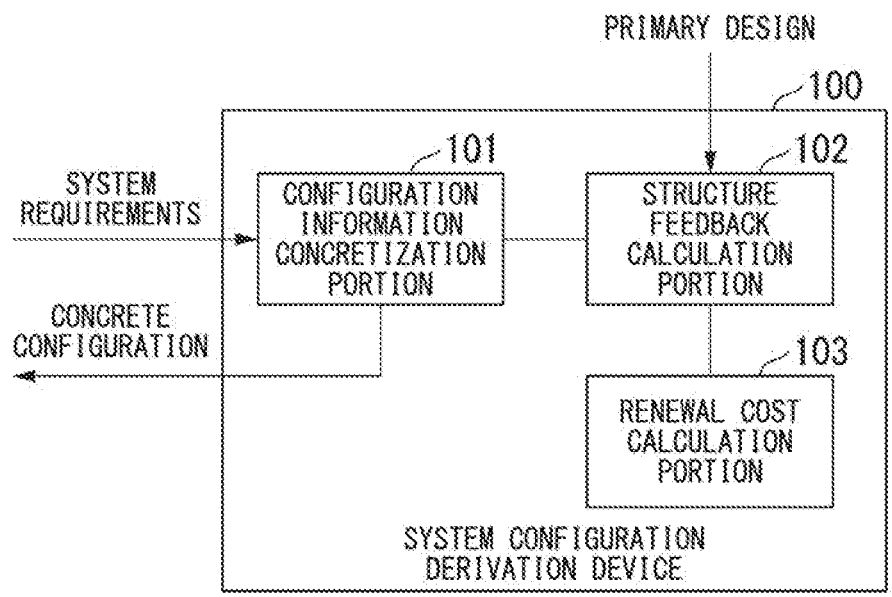
FIG. 1 is a block diagram showing an example configuration of the system configuration derivation device according to the first embodiment of the present disclosure.

The following is a description of the system configuration derivation device for each of the embodiments of the present disclosure with reference to the drawings. In the drawings used for the following explanation, the configuration of parts not related to this disclosure may be omitted and not illustrated.

First Embodiment (Composition)

FIG. 1 is a block diagram showing an example configuration of the system configuration derivation device according to the first embodiment of the present disclosure.

As shown in FIG. 1, a system configuration derivation device 100 is provided with a configuration information concretization portion 101 that receives an abstract configuration representing system requirements as input and derives a concrete configuration by making it concrete in steps.

The system configuration derivation device 100 is provided with a structure feedback calculation portion 102 that receives as input the concrete configuration representing the primary configuration and the concrete configuration output from the configuration information concretization portion 101, and outputs a structure feedback function that estimates the magnitude of the renewal cost from the primary configuration.

The system configuration derivation device 100 is provided with a renewal cost calculation portion 103 that receives two concrete configurations (primary configuration and new configuration) as input and calculates the renewal cost when changing the configuration from the primary configuration to the new configuration.

The following is a description of the abstract structure and the data structure thereof in the present embodiment. As mentioned above, an abstract configuration is an abstract system configuration that includes undetermined portions regarding configuration and settings. The abstract configuration plays the role of specifying the desired system without referring specifically to the details of the system by writing down only the information that has been determined by the entity that desires the ICT system, i.e., information representing "what requirements are to be met by the system and what functionality is required".

The abstract configuration is based on a graph composed of "nodes," which correspond to the functions of the system and logical and physical components thereof, and "edges" that, by stretching between two nodes, express the relationship between the two nodes. The edges each have an orientation, and for edges from node A to node B, node A is called the "source" and node B is called the "destination". In the following, when referring to nodes and edges without distinction, they are collectively referred to as "entities".

An entity has an "identifier" to uniquely identify the entity concerned in the entire system, a "set value" representing each attached information relating to the entity concerned, and "type information" expressing what kind of concept the entity corresponds to. The identity of an entity in two different abstract configurations is determined by its identifier. In other words, even if the type information is different, if the identifiers are the same, they are treated as "the same entity".

The following is a more detailed description of the "type information" associated with an entity.

Type information plays the role of indicating what type of entity it is associated with. There are two types of types, "abstract types" and "concrete types." Abstract types indicate types of entities such as "Machine" and "HTTP connectable," which do not correspond intuitively to concrete components or connection relationships that exist in reality and thus require further concretization. Concrete types, on the other hand, indicate entities that correspond to concrete components and connection relationships that exist in reality, such as "(concrete machine model number)" or "wired LAN connection".

The node type also has information indicating "required component". This may be present in a plurality, or not at all.

Furthermore, the "set value" of an entity can be defined as a set value for a property defined in the type information of that entity. In other words, the type information has list information "p[1], p[2], . . . , p[n]" of set value keys as property definitions, the "set value" of an entity being defined as the relational data "p[i1]:n1, p[i2]:n2, . . . ", where values are mapped to some or all of these keys.

The above is an explanation of the "type information" associated with an entity. The following is a more detailed description of the "required component" associated with the node type.

A required component associated with a node type intuitively indicates a dependent component required for the normal operation of the component corresponding to the node having the node type. For example, the "App" type, which indicates an application, has "Machine" as a required component, which refers to the fact that the application requires a machine to host it in order to operate.

A node with a node type associated with a required component is simply expressed as the node itself has the required component. By stretching an edge with the special concrete edge type "WIRE:req" (the "req" part varies depending on the required component) from node N1 to another node N2 for the required component "req" held by node N1, the component that is required can be connected. This corresponds to the selection of N2 as the component req required by N1. For the required component that a node has, it is possible to satisfy the requirement by connecting the appropriate component.

For example, taking the App type example above, by connecting the "WIRE:Machine" type edge from App type node MyApp to Machine type node Machine1, the host destination of MyApp can be specified as Machine1.

Only one node at most can be connected to the required component of a node. For example, after connecting to Machine1 in the previous example, MyApp cannot be connected to another Machine edge Machine2 by an additional "WIRE:Machine" type edge.

The above is an explanation of the "required component" associated with node types.

Figure 2:
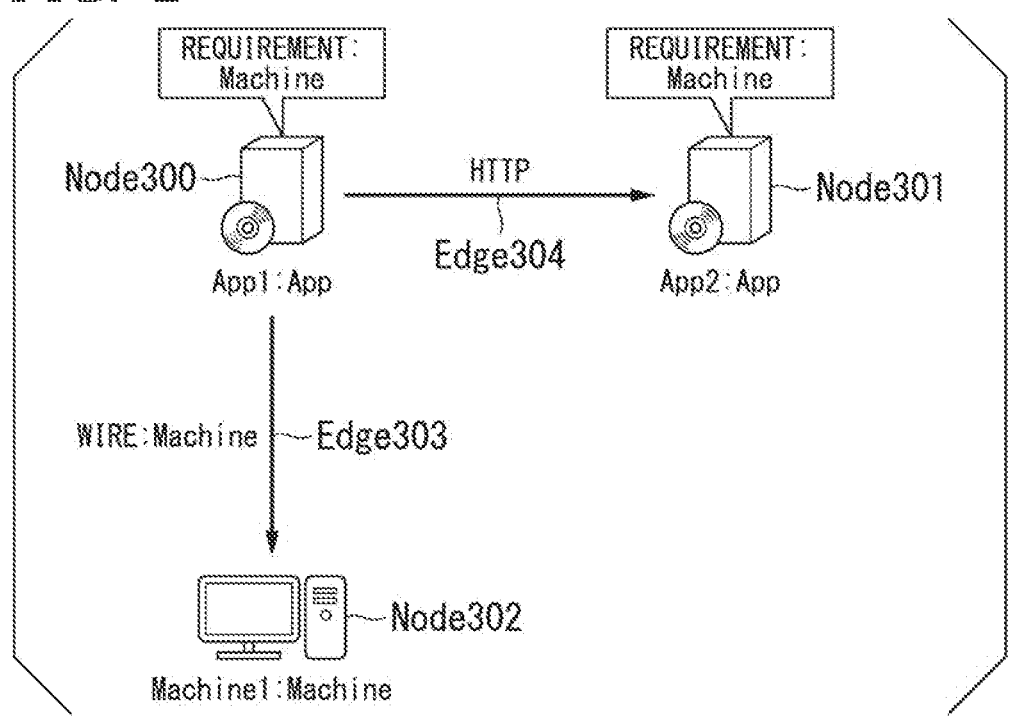
FIG. 2 is an explanatory diagram showing an example of an abstract configuration given as one of the inputs to the system configuration derivation device.

FIG. 2 shows an example of an abstract configuration. The labeled icons, such as those shown in Node 300, Node 301, and Node 302, indicate nodes. The labeled arrows, as denoted by Edge 303 and Edge 304, indicate edges. Node labels are of the form "(identifier):(type name)", while edge labels are only type names. In addition, Node 300 and Node 301 are marked with a callout indicating the required component. For the sake of drawing simplicity, information on requirements and labels will be omitted where appropriate.

Both Node 300 and Node 301 represent applications, and both are assumed here to correspond to concrete system configuration components without any undetermined parts. Both of these nodes have a "Machine" required component, with Node 300's requirement being satisfied by having Machine1 connected, while Node 301's requirement is not satisfied.

Node 302 is a node that represents "some machine". In other words, it has been determined that the machine is capable of running applications, but it has not been determined what specific products will be used here.

Edge 303 is an edge indicating a specific relationship, indicating that the source node Node 300 is hosted on the destination node Node 302. By connecting Node 302 to Node 300 by this edge, the "Machine" requirement of Node 300 is satisfied.

Edge 304 is an edge that represents an abstract relationship (in the sense that the concrete communication path is undefined), indicating that the source node Node 300 is guaranteed to be able to send HTTP requests to the destination node Node 301 in some way.

The above is a description of a concrete example of an abstract configuration.

Figure 3:
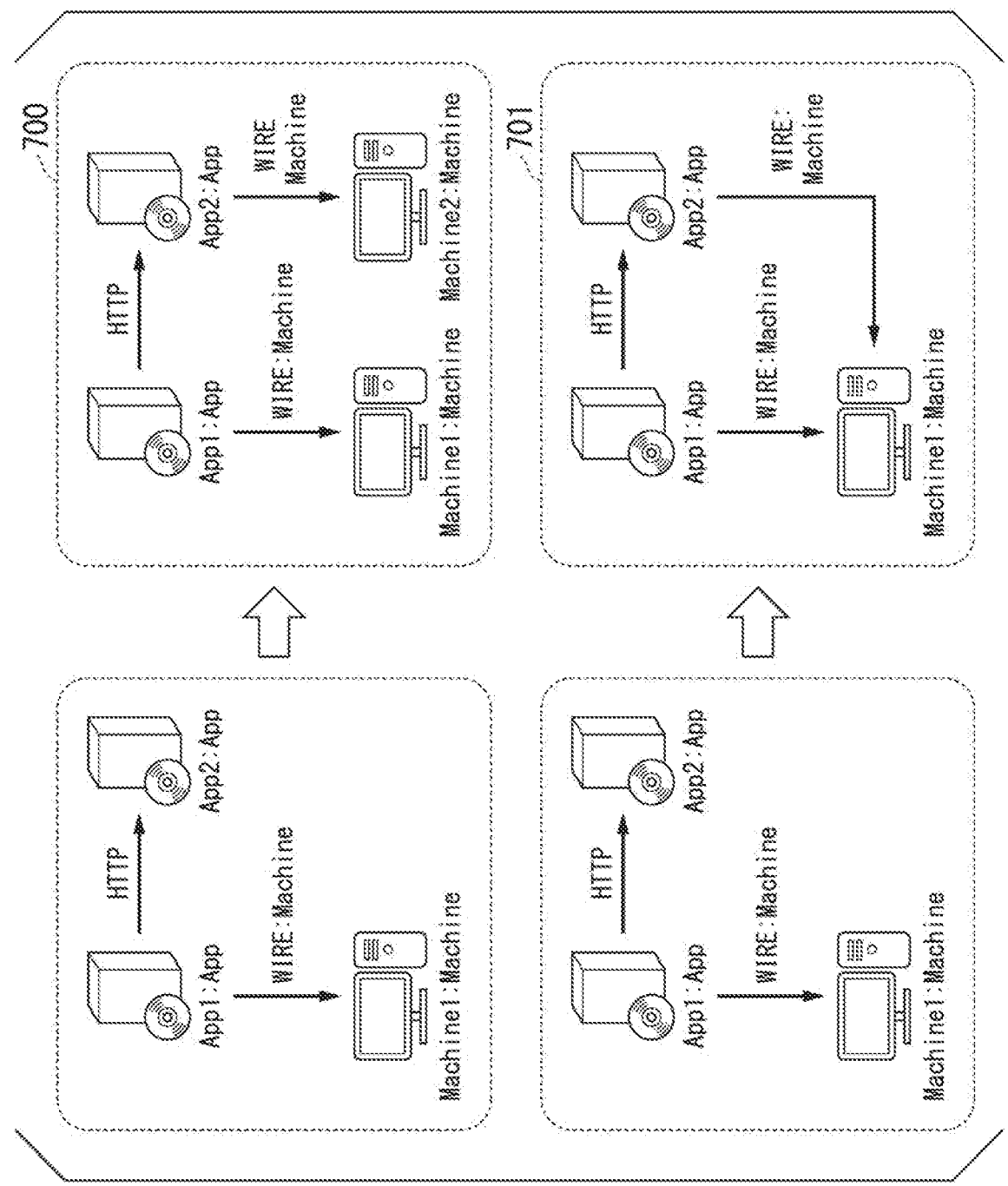
FIG. 3 is an explanatory diagram showing an example of the embodiment.

Next, an example will be used to illustrate the concretization of the abstract configuration using a concrete example. FIG. 3 illustrates an example of how the abstract configuration shown in FIG. 2 can be embodied in two different ways.

Application example 700 is the case where a new Machine type node Machine2 is created and connected for the "Machine" requirement of node App 2.

Application example 701 is the case where Machine type node Machine1 already included in FIG. 2 is connected for the "Machine" requirement of node App2.

Both of the two cases shown in FIG. 3 represent transformations that, by resolving the "Machine" requirement of the abstract element, node App2, advance the concretization by one step with respect to FIG. 2 showing the respective abstract configurations.

Moreover, it is worth noting that although the two aforementioned cases resolve exactly the same abstract element (i.e., the "Machine" requirement of node App2), the difference in the method of resolution results in a difference in the resulting configuration. In other words, even if the abstract configuration of the conversion source is exactly the same, different conversion methods will lead to various configurations, resulting in various concrete configurations. The above is an explanation of the rewriting of an abstract configuration by concretization.

Next, the exact definition of a concrete configuration derived by the present embodiment will be explained. A concrete configuration in the present embodiment refers to a fully concretized abstract configuration. Here, an abstract configuration being "fully concretized" means that all of the following three concretization conditions (Concretization Condition 1) (Concretization Condition 2) and (Concretization Condition 3) are satisfied.

(Concretization Condition 1) The abstract configuration does not contain a single node with an abstract type.

(Concretization Condition 2) The abstract configuration does not contain a single edge with an abstract type.

(Concretization Condition 3) The abstract configuration does not contain a single unsatisfied requirement.

From the definition of a concretization condition, it can be said that an abstract configuration that does not include any unit requirements indicates a state where there are no ambiguous portions as an ICT system and all the components required for operation (i.e., various requirements for each node) are complete. Therefore, the concrete configuration corresponds to a system that functions perfectly.

(Operation)

The system configuration derivation device 100 receives as input an abstract configuration representing a requirement and outputs a concrete configuration that satisfies the requirement. Furthermore, the system configuration derivation device 100 of the present embodiment receives as input the primary configuration, which is the configuration of the first stage of the system to be designed.

Here, the primary configuration is intended to be replaced by a concrete configuration generated by concretizing requirements input at the same time. Accordingly, in many cases, the primary configuration assumes the input of that which resembles the requirements in the main requirements. However, no correlation need be recognized between the aforementioned requirements and the aforementioned primary configuration in applying the present embodiment.

The following is a detailed description of the processing of each part of the system configuration derivation device 100.

First, the operation of the renewal cost calculation portion 103 in the present embodiment is described.

The renewal cost calculation portion 103 receives the two concrete configurations "primary configuration" and "new configuration" and calculates the value of the renewal cost required to change the configuration from the primary configuration to the new configuration.

In the present embodiment, the renewal cost calculation portion 103 is not restricted to any particular method for calculating renewal costs, but some examples of specific methods are described below.

Examples of specific methods by which the renewal cost calculation portion 103 calculates the renewal cost include methods of applying automatic system configuration change technology disclosed in Non-Patent Document 2 (T. Kuroda and A. Gokhale, "Model-based IT Change Management for Large System Definitions with State-related Dependencies," 2014 IEEE 18th International Enterprise Distributed Object Computing Conference, Ulm, 2014, pp. 170-179) and Non-Patent Document 3 (M. Nakanoya, T. Kuroda and A. Kitano, "Automated Change Planning for Differential Update IT Systems with State Constraint," 2016 IEEE 20th International Enterprise Distributed Object Computing Workshop (EDOCW), Vienna, 2016, pp. 1-9. Non-Patent Document 2 and Non-Patent Document 3 disclose automatic renewal procedure calculation methods that calculate a list of required renewal tasks (=renewal procedures of minimum granularity) based on dependency information, etc. between components for the system configuration expressed in a graph-like representation in the present embodiment (hereinafter referred to as "renewal procedures"). For example, the number of renewal tasks included in the renewal procedure calculated by the automatic renewal procedure calculation method can be defined as the renewal cost.

Figure 4:
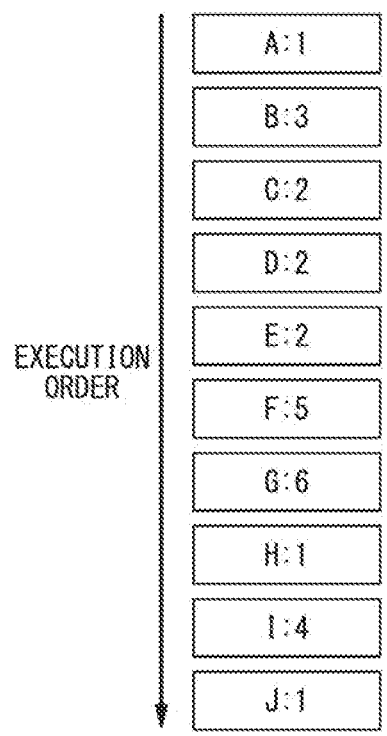
FIG. 4 is an explanatory diagram showing an example of the renewal procedure.

FIG. 4 shows a renewal procedure including 10 tasks A, B, . . . , J. In this case, the renewal cost would be 10 using the calculation method described above.

Another example is the following calculation method. If the individual renewal cost for each renewal task (hereinafter referred to as "unitary renewal cost") is known from the predefined model of each component, the sum of the unitary renewal costs for each renewal task included in the renewal procedure calculated by the above automatic renewal procedure calculation method may be defined as the renewal cost.

The 10 tasks A, B, . . . , J shown in FIG. 4 have integer values 1, 3, 2, 2, 2, 5, 6, 1, 4, 1, respectively, as unitary renewal costs. In this case, the renewal cost using the calculation method above would be the sum of these 1+3+2+2+2+5+6+1+4+1=27.

Yet another example is the following calculation method. Non-Patent Document 2 also describes a method for obtaining a list of renewal tasks not as a single sequence of procedures arranged in the aforementioned (valid) order of execution, but as a directed acyclic graph (hereinafter referred to as a "task model") connected by dependency relationships between each renewal task. Since two tasks that do not depend on each other can be executed in parallel, the time required for the maximum parallel execution of the task model is considered to be the same as the execution time of the series of tasks within the task model that takes the most time (hereinafter referred to as the "bottleneck procedure"). Therefore, in the method obtained by the "sum of unitary renewal scores" described above, the renewal cost can be defined as that which limits the target of the sum to the bottleneck procedure instead of the entire renewal procedure.

Figure 5:
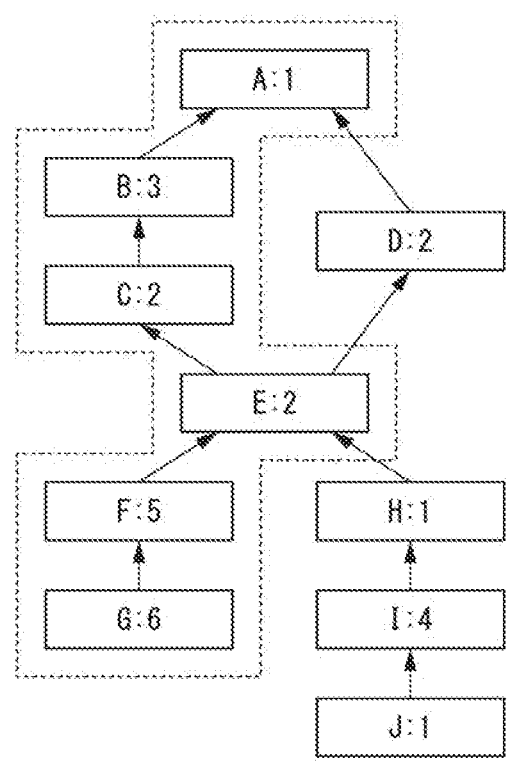
FIG. 5 is an explanatory diagram showing an example of a task model that expresses the renewal procedure.

FIG. 5 shows a task model including the 10 tasks A, B, . . . , J shown in FIG. 4. Here, the arrows represent dependencies, indicating that the dependent-source task cannot be started without completing the dependent-destination task. The task column A, B, C, E, F, and G surrounded by the dotted line represents the bottleneck procedures in the task model described in FIG. 5. In this case, the renewal cost using the calculation method described above is the sum 1+3+2+2+5+6=19 of the unitary renewal scores of the tasks included in the aforementioned bottleneck procedure.

The above is an example of a specific method of realizing the operation of the renewal cost calculation portion 103 in the present embodiment. However, as mentioned above, the specific method of realizing the operation of the renewal cost calculation portion 103 in the present embodiment is not limited to the three examples described above. Nor does it have to be based on the methods described in Non-Patent Document 2 and Non-Patent Document 3.

Next, the operation of the structure feedback calculation portion 102 in the present embodiment is described.

Figure 6:
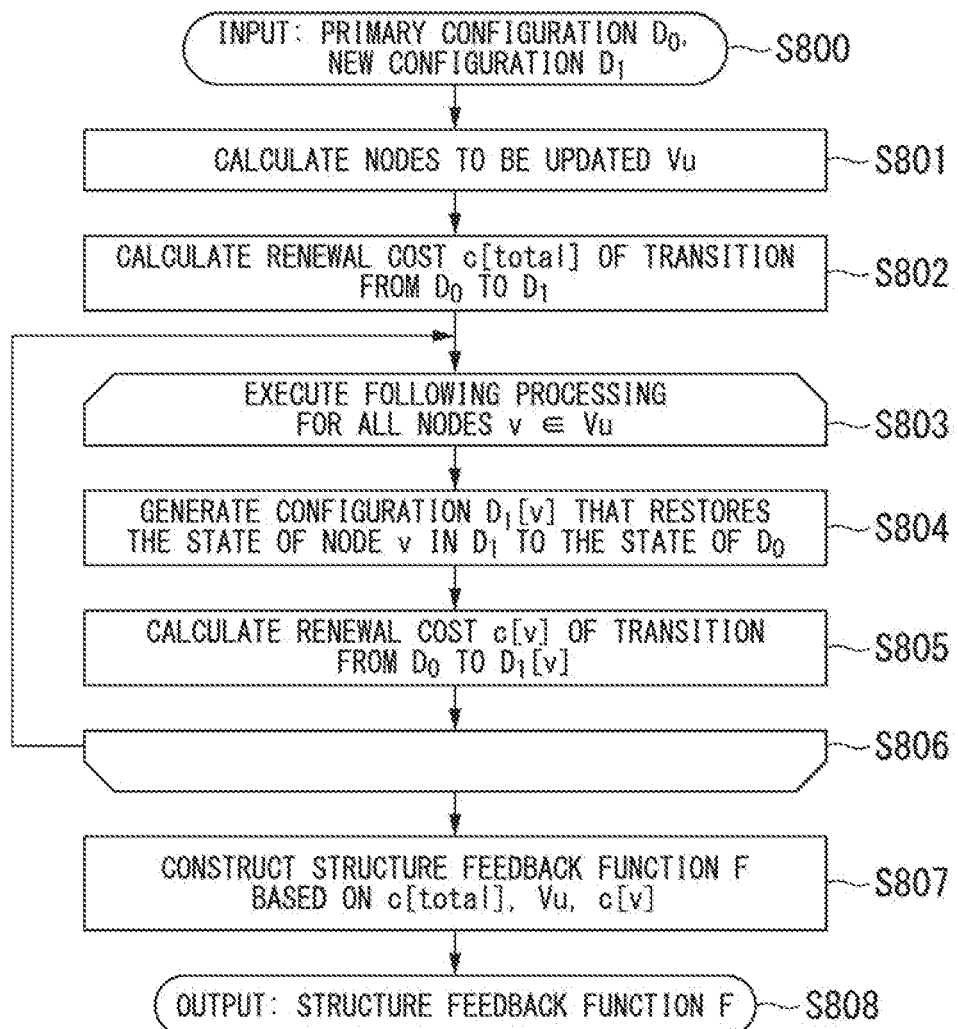
FIG. 6 is a flowchart illustrating the operation of the structure feedback calculation portion 102 of the system configuration derivation device according to the first embodiment of the present disclosure.

FIG. 6 is a flowchart diagram showing the entirety of the operation of the structure feedback calculation portion 102 according to the first embodiment.

The structure feedback calculation portion 102 receives the primary configuration $D_0$ and the new configuration $D_1$ as input (Step S800).

The structure feedback calculation portion 102 calculates Vu, the list of (identifiers of) nodes to be updated. A node to be updated (for renewal from $D_0$ to $D_1$) refers to a node, among nodes included in $D_1$, whose states differ between $D_0$ and $D_1$ and which are required to perform a renewal task when the system is renewed. Here, the situation where "the status of the node is different" includes scenarios such as the set value set for a mode differing, different nodes being connected with respect in response to the node requirement, or the node itself not existing (in $D_0$) (Step S801).

Note that the renewal procedure from $D_0$ to $D_1$ does not necessarily include only the "task of updating the node to be renewed". For example, even for a node in which there is no difference in settings between $D_0$ and $D_1$ and so no need to update, tasks such as restarting may be required due to changes in related system components. In this case, the node is not included in the nodes to be updated.

The structure feedback calculation portion 102 inputs $D_0$ and $D_1$ to the renewal cost calculation portion 103 and obtains the output thereof to obtain the renewal cost c[total] from $D_0$ to $D_1$ (Step S802).

The structure feedback calculation portion 102 performs steps S804 and S805 for all nodes to be updated v∈Vu (Step S803).

The structure feedback calculation portion 102 generates a configuration that restores the state of node v in $D_1$ to the state in $D_0$, and sets that as $D_1[v]$ (Step S804).

Here, "restoring the state of node v to the state in $D_0$" refers to the following operation. The node v to be updated is the target of the update because its state differs between $D_0$ and $D_1$. Therefore, matching the state of v to that in $D_0$ is called restoration. In other words, by performing operations such as if set value differs match it to the set value at the time of $D_0$, if the component corresponding to the requirement differs, reconnect it to the required component in $D_0$, if originally a non-existent component, by performing operations such as removing the node itself, match the state of the node v at time $D_1$ to $D_0$, and "restore (to the state at $D_0$)" so that there is no need to perform update tasks related to v.

The structure feedback calculation portion 102 inputs $D_0$ and $D_1[v]$ to the renewal cost calculation portion 103 and obtains the output thereof to obtain the renewal cost c[v] from $D_0$ to $D_1[v]$ (Step S805).

The structure feedback calculation portion 102 proceeds to Step S807 when the execution of steps S804 and S805 for all nodes to be updated v∈Vu is completed (Step S806).

The structure feedback calculation portion 102 constructs a structure feedback function F based on, in addition to the abstract configurations $D_0$ and $D_1$, which are inputs, c[total], Vu, and c[v] obtained up to the previous step (Step S807). A detailed description of the structure feedback function to be constructed is given below (FIG. 7).

The structure feedback calculation portion 102 outputs the structure feedback function F obtained in the previous step (Step S808).

The above is a description of the operation of the structure feedback calculation portion 102 in the present embodiment.

Figure 7:
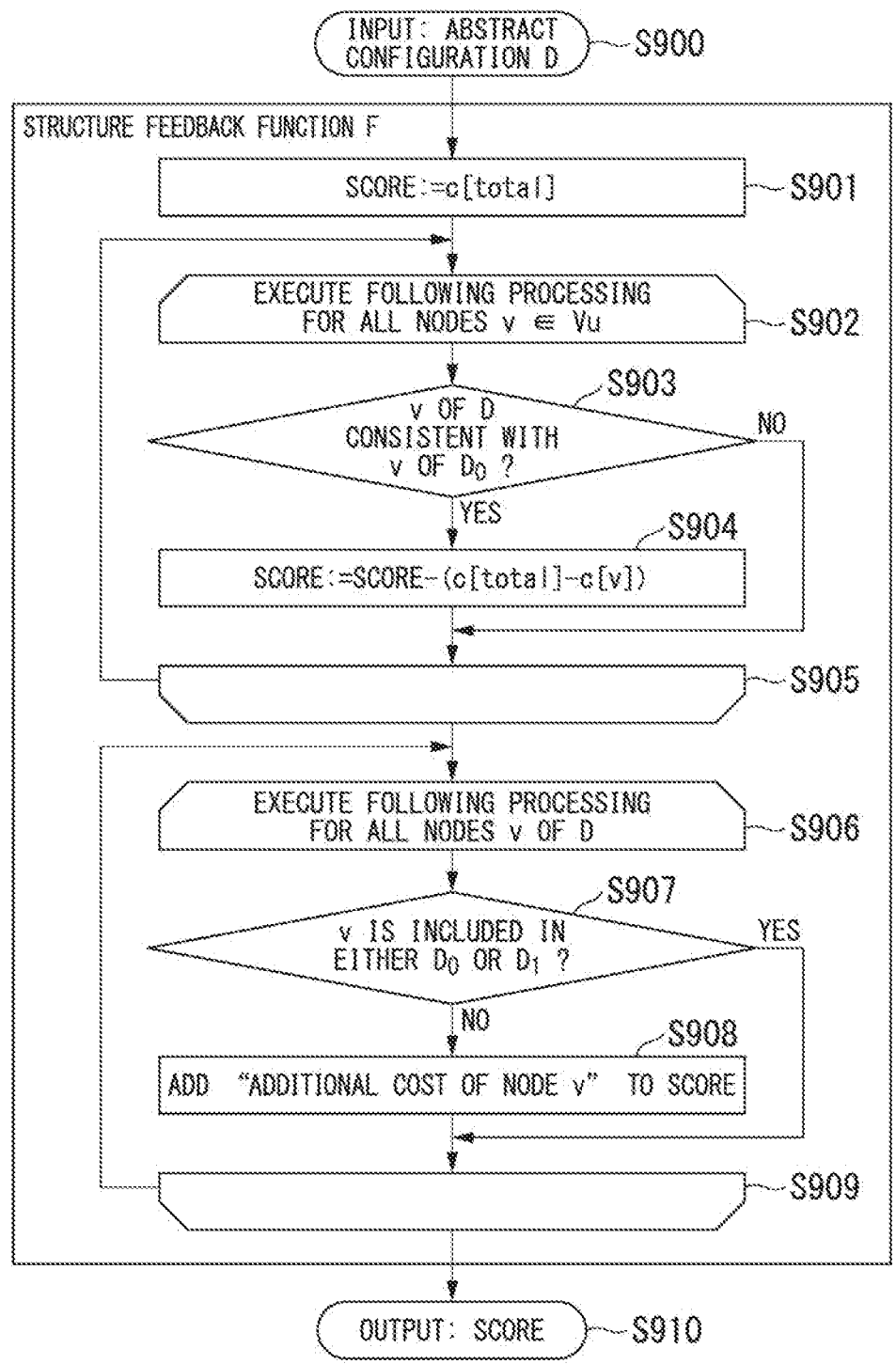
FIG. 7 is a flowchart explaining the processing contents of the structure feedback function in the first embodiment of the present disclosure.

The specifics of the structure feedback function constructed in Step S807 in FIG. 6 above are then explained using FIG. 7.

FIG. 7 is a flowchart showing the specific processing executed until the structure feedback function F, which is constructed in Step S807, evaluates the input abstract configuration T and outputs the evaluation value SCORE.

In the description of each step in FIG. 7, the assumption is made that, in addition to the input abstract configuration, $D_0$, $D_1$, c[total], Vu, and c[v] can be used as data, as described in Step S807 in FIG. 6 above.

The structure feedback function F receives the abstract configuration D as input (Step S900).

The structure feedback function F defines the initial value of the evaluation value SCORE as c[total] (Step S901).

The structure feedback function F performs steps S903 and S904 for all (identifiers of) nodes v included in the nodes Vu to be updated (Step S902).

The structure feedback function F verifies whether node v in the input abstract configuration D is consistent with node v in the primary configuration $D_0$, and if so, goes to Step S904; if not, goes to Step S902 (Step S903).

Here, "(node v in D is consistent with node v in $D_0$)" means that the abstract configuration D can be converted to an abstract configuration that contains node v in the same state as Do by proceeding with the concretization of the abstract configuration D. Three specific examples are given below.

(Example 1) For example, if node v is not included in D and v can be added to D by subsequent concretization, then it is consistent.

(Example 2) For example, if node v is included in D, and a parameter has a value different from the value at $D_0$, then it is not consistent. This is because it is not possible to change the set value already set for the parameter by the concretization.

(Example 3) For example, if node v is included in D, and either "(1) the same value as the value in $D_0$ is set or (2) the value is not set" holds true for all parameters, then it is consistent. This is because in this case, by concretizing so as to set the same set value as v in Do in parameters not yet set for v in D, it can be concretized in exactly the same node as v in $D_0$.

The structure feedback function F subtracts c[total]−c[v] from the evaluated value SCORE (performs positive feedback) (Step S904). If Step S903 is not consistent, the feedback is negative since there is no subtraction. Here, the evaluation value SCORE represents the "magnitude of the renewal cost," so a lower value indicates a better configuration, and subtraction implies positive feedback.

The structure feedback function F proceeds to Step S906 (Step S905) when the execution of steps S903 and S904 is completed for all (identifiers of) nodes v in the node Vu to be updated.

The structure feedback function F performs steps S907 and S908 for all (identifiers of) nodes v in the abstract configuration D (Step S906).

The structure feedback function F verifies whether node v is included in either $D_0$ or $D_1$, and if included in either, advances to Step S906; and if not included in either of them, advances to Step S908 (Step S907).

The structure feedback function F adds "additional cost of node v" to SCORE. The "additional cost of node v" refers to the renewal cost incurred when adding a component equivalent to node v to the system configuration (Step S908).

Here, the value to be used as the "additional cost of node v" used by the structure feedback can be considered to depend on how the renewal cost is calculated in the renewal cost calculation portion 103. For example, if it is simply calculated as the number of tasks included in the renewal procedure, the additional cost of node v might be 1. On the other hand, if the cost is calculated as the sum of the unitary renewal costs of the tasks included in the renewal procedure, the cost of adding node v could be "the unitary renewal cost of the renewal task, which means 'adding node v'".

However, the "additional cost of node v" used by the structure feedback is not limited to the specific definition described above. For example, the additional cost may be configured to be ignored as zero.

The structure feedback function F proceeds to Step S910 when the execution of steps S907 and S908 is completed for all (identifiers of) nodes v in the abstract configuration D (Step S909).

The structure feedback function F outputs the evaluation value SCORE (Step S910).

The above is a description of the specific processing of the structure feedback function F, which is constructed in Step S807 in FIG. 6. In Step S807 in FIG. 6, a function that performs the above process is constructed and output from the structure feedback calculation portion 102 as a value.

The following describes the procedure for calculating the evaluation value of the structure feedback F described above, where the value calculated by the procedure is an "estimate of the renewal cost from the primary configuration" for the abstract configuration.

The "renewal cost c[v] from $D_0$ to $D_1$[v]" calculated in Step S805 in FIG. 6 intuitively corresponds to the value of "the renewal cost when, among the renewal tasks included in the renewal procedure from $D_0$ to $D_1$, it is possible to exclude those derived from the update of v".

In other words, if abstract configuration D could be concretized into "a configuration that does not require updating of v", the renewal cost can be expected to improve from c[total] by "c[total]−c[v]". Therefore, hereafter, "c[total]−c[v]" is referred to as the "prospective improvement score relating to v".

Based on the above ideas, the following estimate can be made:

(1) First, let SCORE be the value of c[total].

(2) Then, for the abstract configuration to be evaluated, check whether it is possible not to update the node to be updated (i.e., whether it is consistent with $D_0$ in relation to the node to be updated), and if possible, for that node, the improvement in the renewal score can be expected to be as much as the expected improvement score, so subtract the value of the expected improvement score for that node from SCORE.

(3) The SCORE calculated by the procedure described above is an estimate of the lower bound on the renewal score ultimately brought about by the node to be updated.

The procedures described above as (1) to (3) are represented as the process up to Step S905 in FIG. 7.

In addition, there may be nodes in the abstract configuration that are not included in either $D_0$ or $D_1$, and these are not considered in the above estimation because they are naturally not nodes to be updated. It is also difficult to consider how these newly added nodes will interact with existing nodes (in the renewal procedure).

Accordingly, the structure feedback function F simply adds the expected renewal costs (i.e., additional costs) of introducing these independently for new nodes to SCORE, respectively.

This procedure is represented as the process from Step S906 in FIG. 7.

The above is the explanation for the fact that the structure feedback evaluation value calculation procedure is an "estimate of the renewal cost from the primary configuration" for the abstract configuration.

Figure 8A:
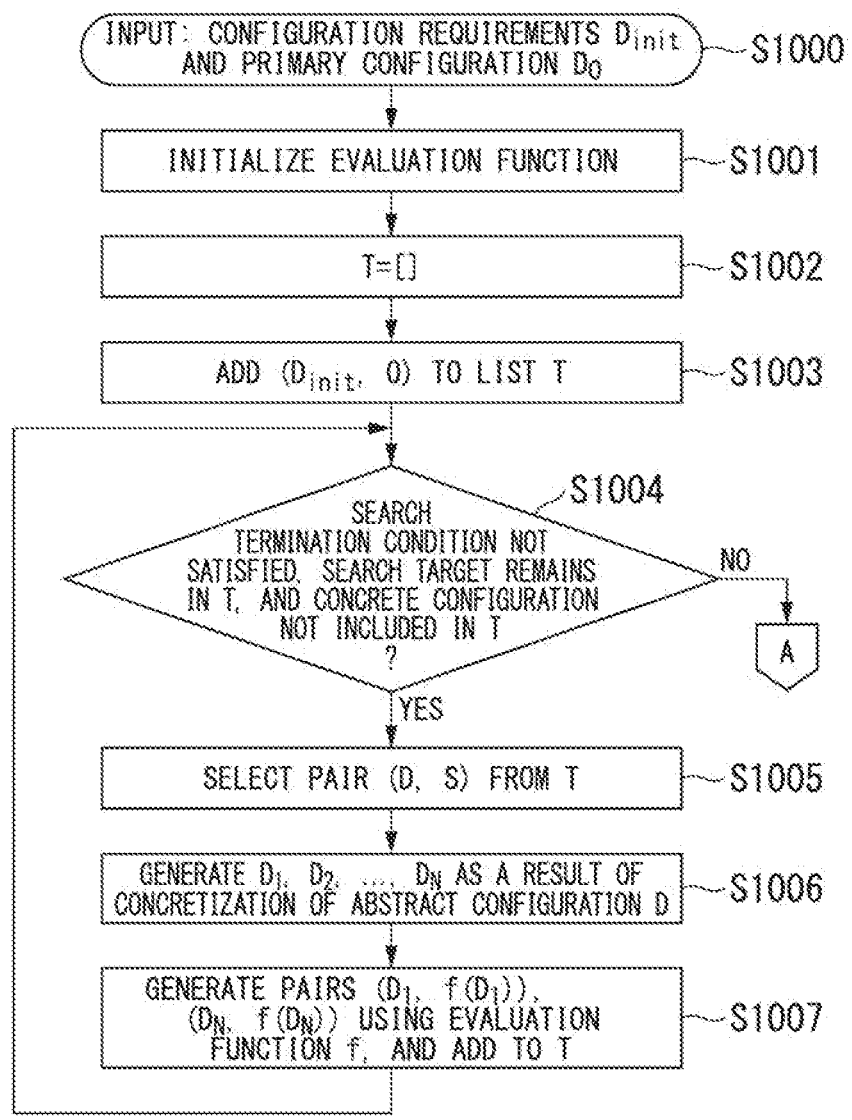
FIG. 8A is a first flowchart diagram illustrating the operation of the configuration information concretization portion 101 of the system configuration derivation device in the first embodiment of the present disclosure.
Figure 8B:
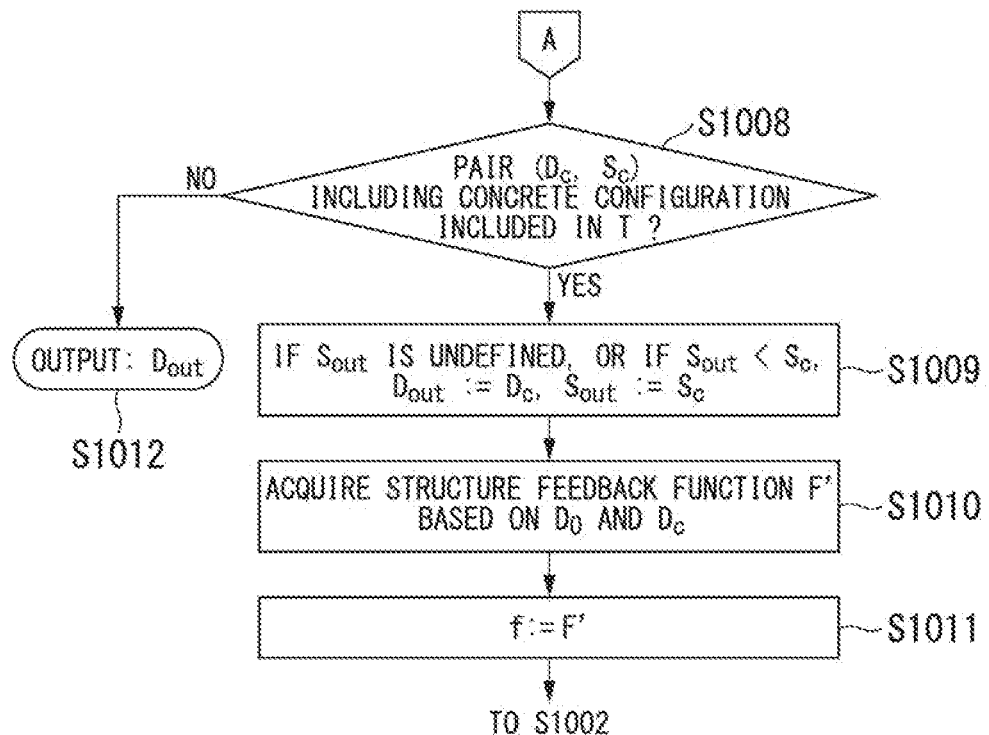
FIG. 8B is a second flowchart diagram illustrating the operation of the configuration information concretization portion 101 of the system configuration derivation device in the first embodiment of the present disclosure.

Next, the operation of the configuration information concretization portion 101 of the present embodiment designing the ICT system is explained with reference to FIG. 8A and FIG. 8B. FIG. 8A and FIG. 8B are the first and second flowchart diagrams, respectively, representing the procedures by which the configuration information concretization portion 101 of the present embodiment derives the concrete configuration of the system.

The configuration information concretization portion 101 accepts as input the configuration requirements $D_{init}$ and primary configuration $D_0$ expressed in the form of an abstract configuration from input/output devices (Step S1000).

The configuration information concretization portion 101 initializes the evaluation function f. Here, an evaluation function is a function that takes an abstract configuration as input and outputs an evaluation value (Step S1001).

In the present embodiment, the method of initializing the evaluation function f in Step S1001 is not restricted to a specific method. As a specific method of initialization, it is possible to input a function that means, for example, a constant function "returns a constant value such as 0, regardless of the input," "returns the total number of entities included," "returns the total number of requirements included," or "returns the graph structural similarity with the primary configuration (where a lower value indicates greater similarity)."

The configuration information concretization portion 101 initializes the search candidate list T with an empty list (Step S1002).

Added to the search candidate list are pairs including two elements, such that the first element is the abstract configuration and the second element is its evaluation value.

The configuration information concretization portion 101 adds the pair ($D_{init}$, 0) to the search candidate list T (Step S1003).

If the search termination condition described below is not satisfied, the search target remains in the search candidate list T, and the search candidate list T does not contain any concrete configuration, the configuration information concretization portion 101 proceeds to Step S1005; otherwise, it proceeds to Step S1008 in FIG. 8B (Step S1004).

The configuration information concretization portion 101 selects one of the pairs (D, S) included in the search candidate list T, the pairs satisfying all of the following three conditions (1), (2), and (3) (Step S1005).

(1) Abstract configuration D is not fully made concrete.

(2) No pair with the same first element as abstract configuration D has been previously selected in this step.

(3) The evaluation value S is the lowest among the pairs of evaluation values included in the search candidate list T.

The configuration information concretization portion 101 generates abstract configurations $D_1, D_2, \ldots, D_N$ as a result of concretizing the abstract configuration D selected in Step S1005 (Step S1006).

Here, as a specific method for the configuration information concretization portion 101 to concretize the abstract configuration in the present embodiment, one can use a method based on concretization rules described, for example, in Non-Patent Document 1. However, in the present embodiment, the specific method of concretization is not limited to a particular technique.

However, the present embodiment shall satisfy the following three properties (1), (2), and (3). (For example, the method described in Non-Patent Document 1 satisfies these properties.) (1) Once a node is created, it is not deleted by concretization. (2) Concrete edges, once generated, are not deleted by concretization. (3) Once an entity's set values are set, they are not changed or deleted.

The configuration information concretization portion 101 applies the evaluation function f to the abstract configurations $D_1, D_2, \ldots, D_N$ generated in the previous step, and adds all the pairs $(D_1, f(D_1)), (D_2, f(D_2)), \ldots, (D_N, F(D_N))$ to the search candidate list T, respectively. It then returns to Step S1004 (Step S1007).

The configuration information concretization portion 101 proceeds to Step S1012 if the search candidate list T does not include a pair that includes a concrete configuration, and to Step S1009 if a pair ($D_c$, $S_c$) that includes a concrete configuration is included (Step S1008).

If $S_{out}$ is undefined, or if $S_{out}$ is compared with $S_c$ and $S_{out} > S_c$, the configuration information concretization portion 101 updates $D_{out} := D_c$ and $S_{out} := S_c$, respectively (Step S1009).

The configuration information concretization portion 101 inputs the primary configuration $D_0$ and the concrete configuration $D_c$ to the structure feedback calculation portion 102 ($D_c$ is input as "new configuration") to acquire the output structure feedback function F' (Step S1010).

The configuration information concretization portion 101 replaces the evaluation function f with the structure feedback function F' obtained in the previous step and returns to Step S1002 (Step S1011).

The configuration information concretization portion 101 outputs the concrete configuration $D_{out}$ to input/output devices as a result of the system configuration derivation device 100 (Step S1012).

The above is a description of the operation of the configuration information concretization portion 101.

The search termination condition used for the conditional branching in Step S1004 is explained here. FIG. 8A and FIG. 8B are feedback loop procedures that improve the concretization method based on the concrete configuration obtained through concretization. Therefore, unless a mechanism is put in place to stop the entire feedback loop, the process is basically unstoppable.

The search termination condition is responsible for stopping the entire feedback loop, and is defined, for example, by a conditional expression such as: "Concretization has been performed at least ~times in total," "~hours have passed since the start of processing," "Feedback was conducted at least ~times," "An improvement in cost of at least ~ was observed from the initially obtained configuration" and the like. In the present embodiment, any criteria, including those listed above, can be set as a search termination condition, and the method is not limited.

Figure 9:
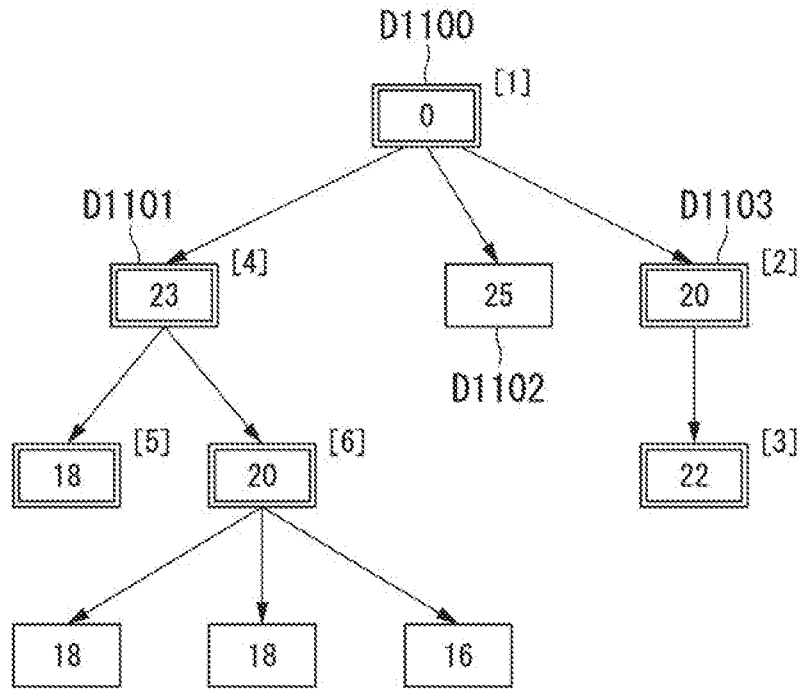
FIG. 9 is an explanatory diagram showing an example of the operation of the configuration information concretization portion 101 of the system configuration derivation device in the first embodiment of the present disclosure.

Next, the overall picture of the actual operation of the configuration information concretization portion 101 in the present embodiment will be overviewed using an example. FIG. 9 is an explanatory diagram illustrating an example of the operation in progress of the configuration information concretization portion 101 in this embodiment.

The rectangles with single or double-line borders with numerical values, illustrated in FIG. 9, denote sets of abstract configurations and similarity scores that have been added to the search candidate list T. The abstract configuration is omitted here, and only the similarity score is known by the numerical value inside. In the present explanation, this set will be referred to as the "search state" for convenience.

A rectangle with a single-line border represents a search state not selected by Step S1005, and a rectangle with a double-line border represents a search state selected by Step S1005. In the upper right corner of the rectangle with a double-lined border, a number enclosed in parentheses "[ ]" is shown, indicating the number of times that state was the selected search state in Step S1005.

The topmost search state D1100 is the search state corresponding to the configuration requirements given as input, and is the one added to the candidate search list T in Step S1003.

The arrows extending from rectangle to rectangle, illustrated in FIG. 9, indicate that when the search state corresponding to the starting point of the arrow in question was selected in Step S1004, the search state corresponding to the end point of the arrow in question was generated in the subsequent Step S1006. In other words, the search state corresponding to the end point of each arrow is obtained by concretizing the abstract configuration of the search state corresponding to the start point of that arrow. In the present explanation, this arrow will be referred to as a "transition" for convenience.

As shown in FIG. 9, in Step S1005, the search state with the lowest evaluation value is selected among the search states that exist at the stage of execution. For example, immediately after search state 2 is selected, the evaluation values of the search states added to the exploration candidate list T are for the search state D1101 with an evaluation value of 23, D1102 with an evaluation value of 25, and D1103 with an evaluation value of 20. However, that which is next selected as state 3 is the search state D1103, which has the lowest evaluation value.

The above is a description of an example for the action of the configuration information concretization portion 101 in the present embodiment.

(Effects)

The configuration information concretization portion 101 of the system configuration derivation device 100 in the present embodiment receives configuration requirements and primary configurations, iteratively concretizes the configuration requirements, performs a tree search on a tree with the abstract configurations as nodes, and ultimately outputs the configuration information of a fully concretized ICT system.

In addition, the configuration information concretization portion 101 in the present embodiment generates a structure feedback function by querying the structure feedback calculation portion 102 each time it seeks a concrete configuration, and repeats the performance of re-concretization with the structure feedback function serving as a priority index in the tree search.

The structure feedback calculation portion 102 in the present embodiment also extracts properties on the graph structure that reduce the renewal cost based on the actual renewal procedure from the primary configuration to the newly obtained configuration, and generates and outputs a structure feedback function that gives a better evaluation to the abstract configuration with the extracted properties.

Therefore, the system configuration derivation device 100 in the present embodiment repeats the feedback loop concerning the renewal cost by obtaining an index for obtaining a configuration with lower renewal cost based on the obtained concrete configuration to perform re-concretization, thereby enabling output of a concrete configuration that satisfies the configuration requirements and has a lower renewal cost from the primary configuration.

Second Embodiment

The second embodiment of the present disclosure is next described with reference to the drawings.

Figure 10:
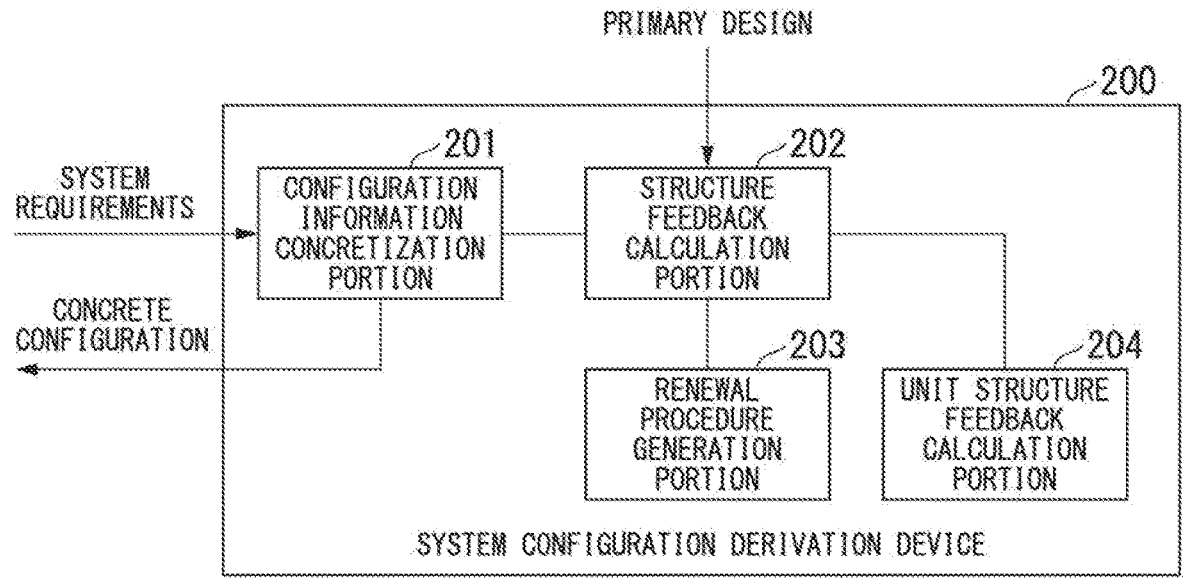
FIG. 10 is a block diagram showing an example configuration of a system configuration derivation device according to the second embodiment of the present disclosure.

FIG. 10 is a block diagram showing an example configuration of a system configuration derivation device 200 in the second embodiment.

As shown in the diagram, the system configuration derivation device 200 is provided with a configuration information concretization portion 201 instead of the configuration information concretization portion 101 of the system configuration derivation device 100.

The system configuration derivation device 200 is provided with a structure feedback calculation portion 202 instead of the structure feedback calculation portion 102 of the system configuration derivation device 100.

The system configuration derivation device 200 is provided with a renewal procedure generation portion 203 that receives two concrete configurations (primary configuration and new configuration) as input and calculates a renewal procedure to change the configuration from the primary configuration to the new configuration.

The system configuration derivation device 200 is provided with a unit structure feedback calculation portion 204 that takes the update procedure and the node to be updated as inputs and, in the execution of the update procedure, calculates the renewal cost assuming that no update for the node is required.

(Operation)

The operation of the configuration information concretization portion 201 in the present embodiment is the same as the operation of the configuration information concretization portion 101 in the first embodiment shown in FIG. 8B, except for the difference that it uses the structure feedback calculation portion 202 instead of the structure feedback calculation portion 102 to obtain structure feedback.

The operation of the renewal procedure generation portion 203 in the present embodiment is described next.

The renewal procedure generation portion 203 receives the two concrete configurations "primary configuration" and "new configuration" and obtains a renewal procedure to change the configuration from the primary configuration to the new configuration.

The renewal procedure that is output shall be represented as a directed acyclic graph (hereinafter referred to as a "task model") in which all renewal tasks (i.e., renewal procedures of minimum granularity) required for system transition from "primary configuration" to "new configuration" are connected by dependencies among tasks.

Although the specific method by which the renewal procedure generation portion 203 calculates the renewal procedure is not limited to a specific method in the present embodiment, it is possible to obtain the renewal procedure in the form of a task model by using the methods described in Non-Patent Document 2 and Non-Patent Document 3, for example.

It is assumed that information equivalent to "which system component (=node) is the update operation for" is associated with each renewal task in the present embodiment.

Let the task model include information on its renewal cost as an attribute. Although there is no particular limitation in the present disclosure as to what value is adopted as this renewal cost, it can be defined as "the number of renewal tasks", "the sum of unitary renewal costs of each renewal task", and the like, as in the renewal cost calculation portion 103 of the first embodiment.

The above is a description of the operation of the renewal procedure generation portion 203 in the present embodiment.

Figure 11:
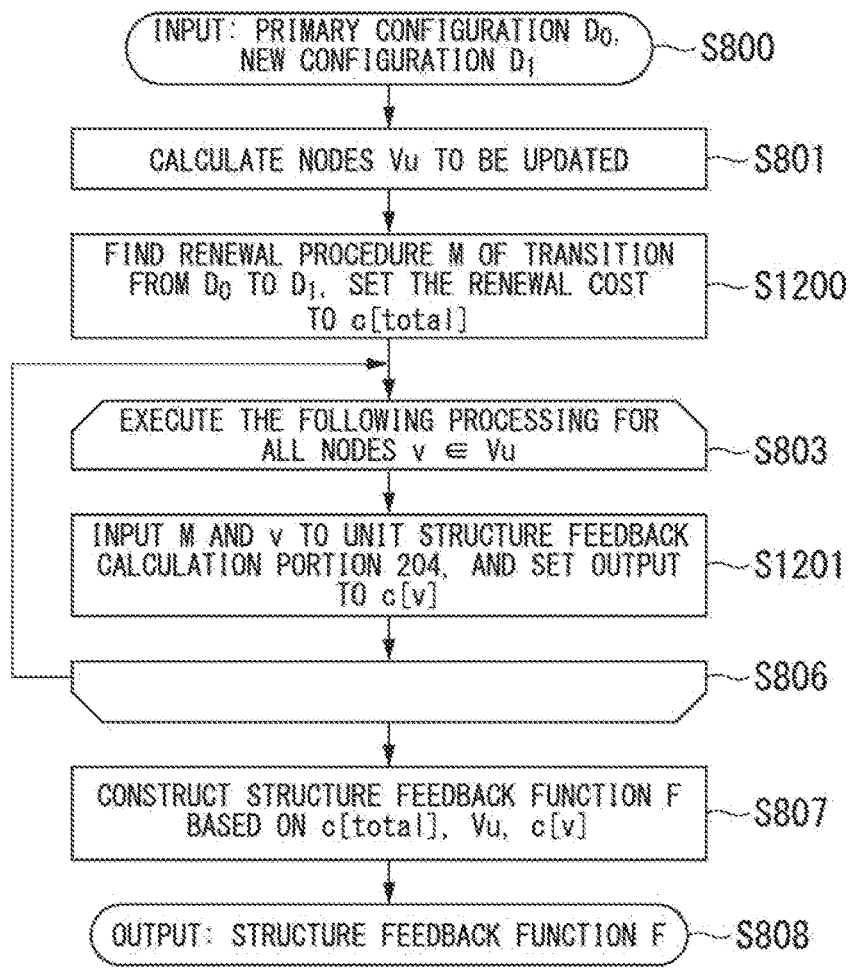
FIG. 11 is a flowchart illustrating the operation of the structure feedback calculation portion 202 in the second embodiment of the system configuration derivation device according to the present disclosure.

Next, the operation of the structure feedback calculation portion 202 in the present embodiment is described. FIG. 11 is a flowchart showing the overall operation of the structure feedback calculation portion 202 of the present embodiment.

As shown in FIG. 11, the operation of the structure feedback calculation portion 202 is exactly the same as that of the structure feedback calculation portion 102 shown in FIG. 7, except that Step S804 is absent and two steps have been changed (S802 and S805 are changed to S1200 and S1201, respectively). Therefore, only the description of the two steps concerned is added here.

The structure feedback calculation portion 202 inputs $D_0$ as the transition source configuration and $D_1$ as the post-transition configuration to the renewal procedure generation portion 203 to obtain a task model M representing the renewal procedure from $D_0$ to $D_1$. Furthermore, make c[total] the renewal cost of the task model M (Step S1200).

The structure feedback calculation portion 202 inputs the task model M and node v to the unit structure feedback calculation portion 204, and makes the renewal cost that is output c[v] (Step S1201).

The above is a description of the two steps in the operation of the structure feedback calculation portion 202 that differ from the structure feedback calculation portion 102.

The operation of the unit structure feedback calculation portion 204 in the present embodiment is described next.

Figure 12:
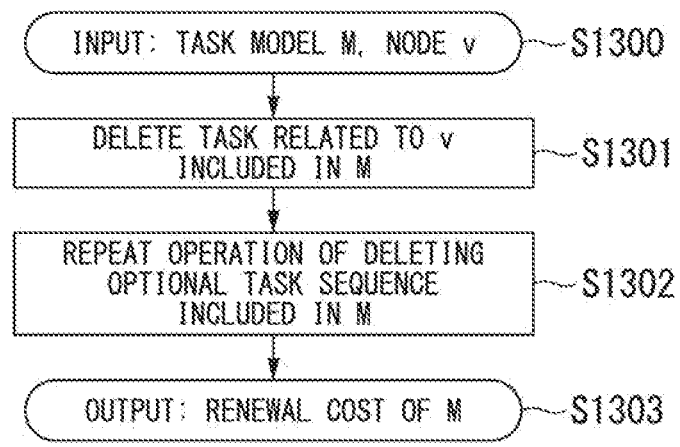
FIG. 12 is a flowchart illustrating the operation of the unit structure feedback calculation portion 204 in the second embodiment of the system configuration derivation device according to the present disclosure.

FIG. 12 is a flowchart diagram showing the overall operation of the unit structure feedback calculation portion 204 in the present embodiment.

The unit structure feedback calculation portion 204 receives the task model M and node v as input (Step S1300).

The unit structure feedback calculation portion 204 deletes the renewal task related to v included in the task model M by a method (described below) that does not affect other tasks (Step S1301).

The method for deleting renewal tasks associated with v included in the task model M without affecting other tasks shall be described. Let $t_1, t_2, \ldots, t_N$ be the tasks included in the task model M that correspond to the update operations on v. If there were no dependencies on these tasks by other tasks, they could simply be deleted from the task model.

On the other hand, if task $t_i$ included in $t_1, t_2, \ldots, t_N$ is dependent by another task, i.e., there are tasks that can only be executed after task $t_i$ has been executed, find "a task sequence that returns from the state of node v in $D_0$ to the original state after the execution of task $t_i$", and replace $t_1, t_2, \ldots, t_N$ with this. The same is true if there is more than one task corresponding to task $t_i$.

The unit structure feedback calculation portion 204 repeats the operation of removing the optional task sequence $t_1, t_2, \ldots, t_N$ related to the node $v_i$ in the task model M if it is included therein. Here, the optional task sequence $t_1, t_2, \ldots, t_N$ related to the node $v_i$ refers to (1) the tasks $t_1, t_2, \ldots, t_N$ representing update operations on the node $v_i$ being arranged in this order in the task model, (2) there being no change in the state of the node $v_i$ before and after the execution of all of these, and (3) the task representing an update operation on another node not being dependent on $t_1, t_2, \ldots, t_{N-1}$ (Step S1302).

The optional task sequence $t_1, t_2, \ldots, t_N$ related to the node $v_i$ here means that, while intuitively being the correct update procedure for the node $v_i$, the execution thereof is not required since they ultimately return to the same state. Therefore, basically such tasks can be omitted (i.e., eliminated from the task model), but if update tasks for another node depend on these tasks, it is required to retain them for the execution of those dependent tasks.

The unit structure feedback calculation portion 204 outputs the renewal cost of the task model M updated by the operations up to the previous step (Step S1303).

The above is a description of the unit structure feedback calculation portion 204.

Figure 13:
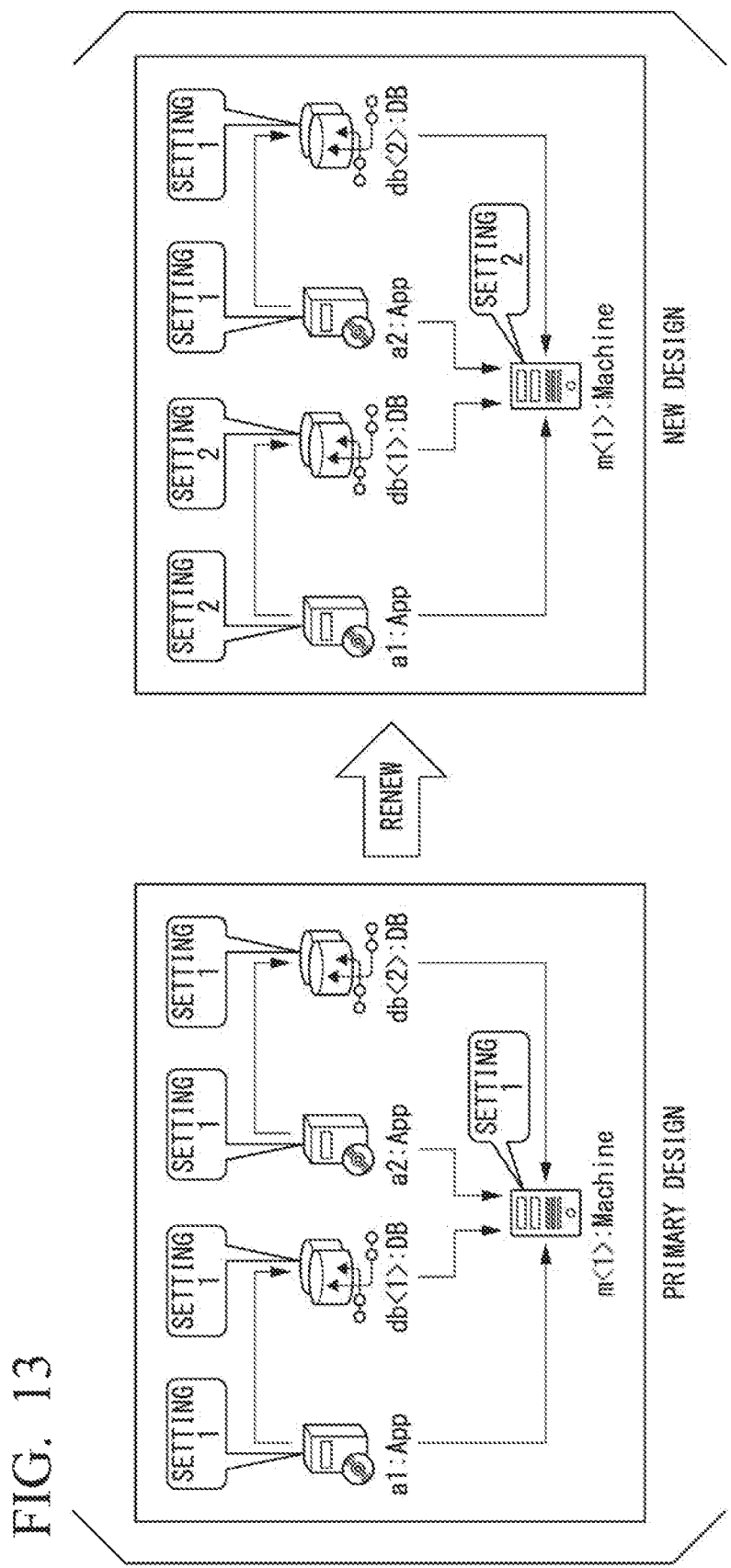
FIG. 13 is an explanatory diagram showing an example of a system update in one embodiment of the present disclosure.
Figure 14:
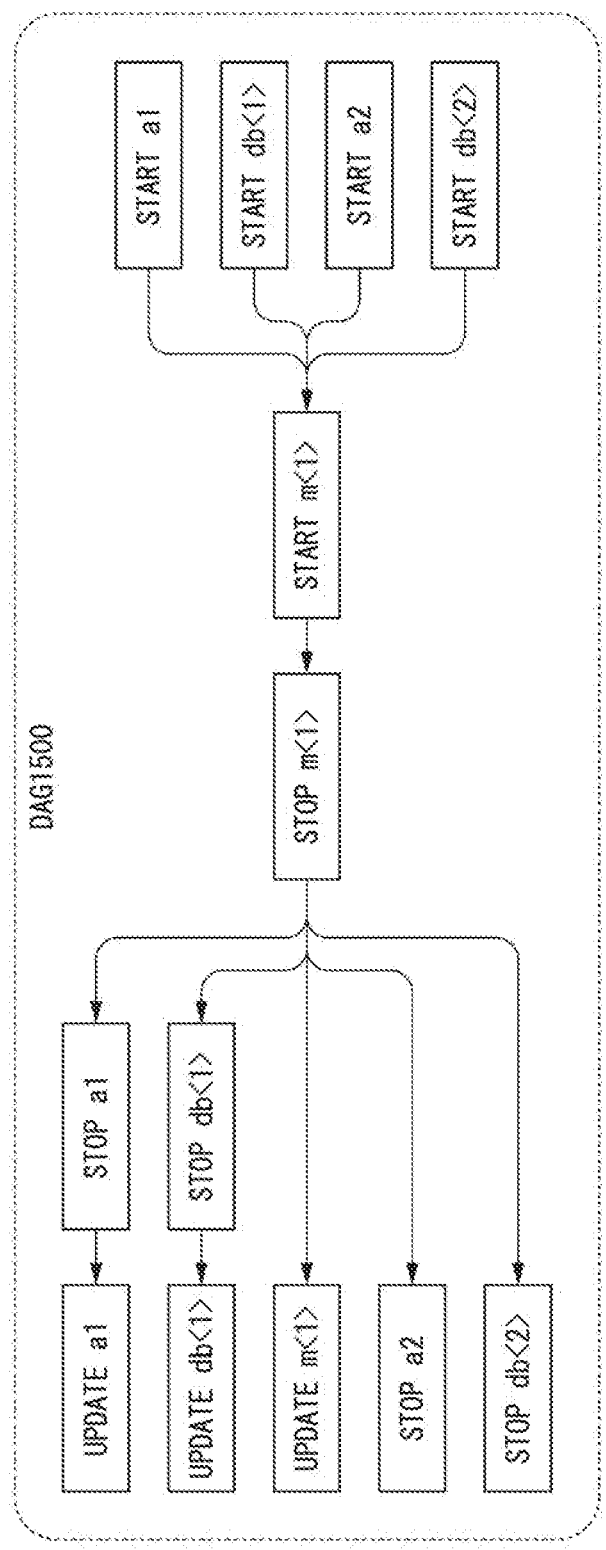
FIG. 14 is an explanatory diagram showing the task model of the renewal procedure for the system update shown in FIG. 13.

The following is an example of the operation of the unit structure feedback calculation portion 204 in the present embodiment with reference to the drawings. FIG. 13 is an example of system renewal, and FIG. 14 is an example of a task model of an update procedure that accomplishes the renewal shown in FIG. 13.

The primary and new configurations shown in FIG. 13 include exactly the same entities, except for the set values. That is, it includes apps a1 and a2, database servers db<1> and db<2> connected thereto respectively, and m<1> the machine hosting all of them.

Such a situation can occur, for example, in the case of adopting a guideline such as "find that which is as similar to the primary configuration as possible" in the initial automatic design process (i.e., search in the absence of structure feedback).

Due to differences in set values, updates are required for a1, db<1>, and m<1>. Here, while a1 and db<1> can be updated simply by updating the set values, a restart is required to reflect the changed set values for a setting change for m<1>.

The update procedure shown in FIG. 14 is effective for a renewal in the above situation. In other words, it is a procedure that, after changing the set values of a1, db<1>, and m<1>, once stops all applications and database servers for a restart of m<1>, and then starts them all up after m<1> is restarted.

The procedure described above can be defined as a DAG 1500 including tasks such as those shown in FIG. 14. In other words, the "stop m<1>" task depends on the "stop a1", "stop db<1>", "stop a2", and "stop db<2>" tasks, while the "start a1", "start db<1>", "start a2", and "start db<2>" tasks depend on the "start m<1>" task. The "a1 stop" and "db<1> stop" depend on "a1 update" and "db<1>update", respectively. These dependencies are clearly indicated as arrows in FIG. 14.

Figure 15:
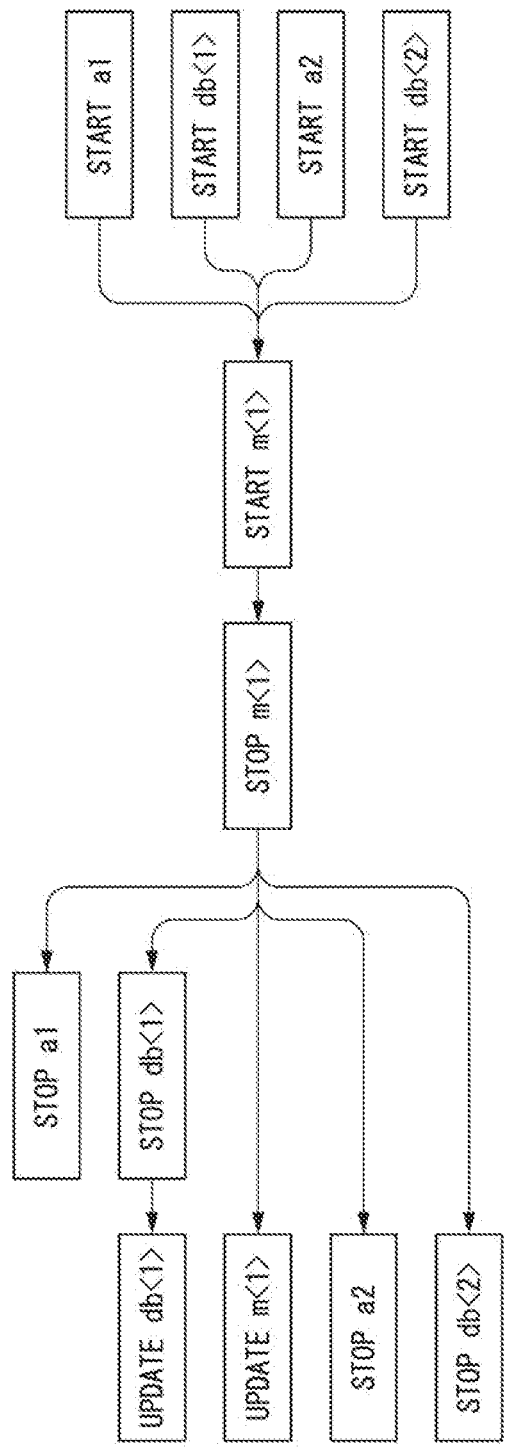
FIG. 15 is an explanatory diagram showing what happens after an attempt is made to delete the task associated with node a1 for the task model shown in FIG. 14.

Referring to FIG. 12, the following illustrates the operation when DAG 1500 is entered as the task model and a1 as the node in the unit structure feedback calculation portion 204. First, in S1301, there are "update a1," "stop a1," and "start a1" as the three candidate tasks for deletion, but since the task "stop m<1>" depends on the "stop a1" task, this step includes the "stop a1" task and replaces them with a sequence of tasks such that a1 is in the startup state before and after the update. Then such a task sequence is "stop a1" and "start a1," so the resulting task model is updated to the one shown in FIG. 15. Since the task model in question does not include an optional task sequence, the output renewal cost is the renewal cost of the task model shown in FIG. 15.

Figure 16:
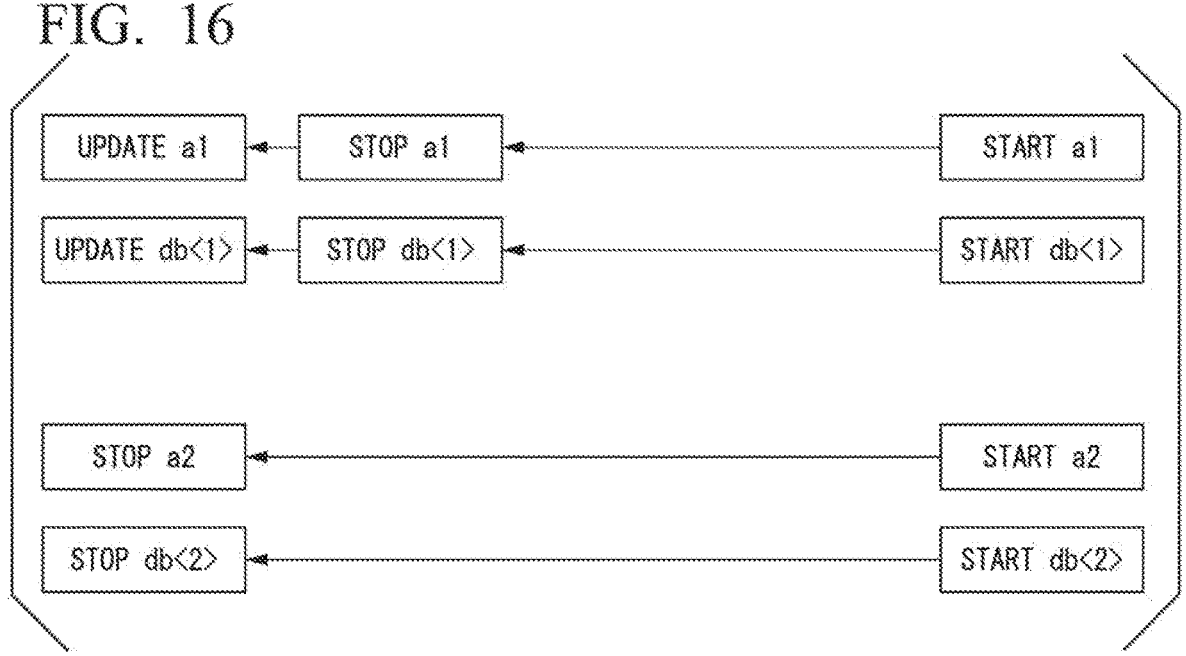
FIG. 16 is an explanatory diagram showing what happens after an attempt is made to delete the task associated with node m <1> for the task model shown in FIG. 14.

The following is an explanation of the operation when DAG 1500 is entered as the task model and m<1> as the node in the unit structure feedback calculation portion 204. First, in S1301, there are "update m<1>", "stop m<1>", and "start m<1>" as the three candidate tasks for deletion, and there are no tasks that are dependent on the tasks "update m<1>" and "stop m<1>" (and not related to m<1>). Therefore, all of these tasks are deleted, resulting in the updated task model shown in FIG. 16. In Step S1302, it is detected that the task model in question contains the following four task sequences that can be omitted.

"Stop a1" and "update a1", •"stop db<1>" and "update db<1>", •"stop a2", •"stop db<2>"

Figure 17:
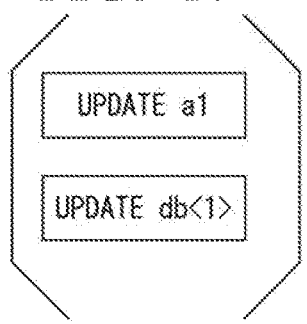
FIG. 17 is an explanatory diagram showing what happens after an attempt is made to delete an omissible task sequence for the task model shown in FIG. 16.
Figure 18:
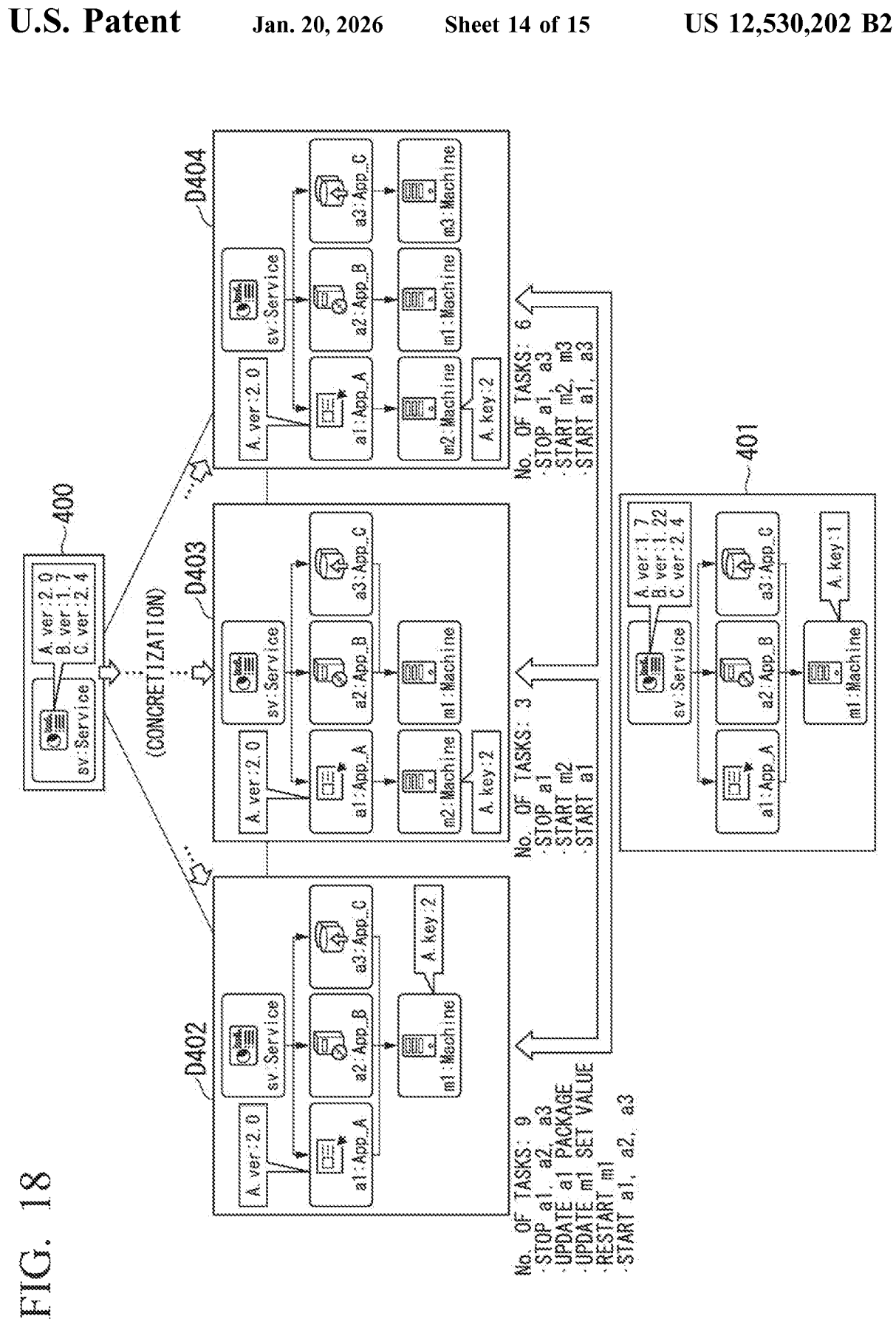
FIG. 18 is an explanatory diagram that explains that a configuration similar to the primary configuration is not necessarily the configuration that minimizes renewal costs.

Deleting all of these results in FIG. 17. The resulting renewal cost that is output is the renewal cost of the task model shown in FIG. 17.

The above is a description of the unit structure feedback calculation portion 204 with specific examples.

(Effects)

The structure feedback calculation portion 202 in the second embodiment differs from the structure feedback calculation portion 102 in that instead of finding "the renewal cost c[v] when each node no longer needs to be updated" used to construct the structure feedback function from the renewal procedure as in the renewal cost calculation portion 103, it is found by modifying the data of the renewal procedure from $D_0$ to $D_1$.

In general, while automatically finding the procedure for system renewal from differences in configuration information is a relatively computationally intensive task, the unit structure feedback calculation portion 204 of the present embodiment employs a procedure that only modifies the task model that has already been calculated, so the renewal cost can be determined quickly.

Therefore, according to the configuration information concretization portion 201 of the present embodiment, the step of obtaining structure feedback is faster than the configuration information concretization portion 101, thereby enabling a faster feedback loop.

(Minimum Configuration)

Figure 19:
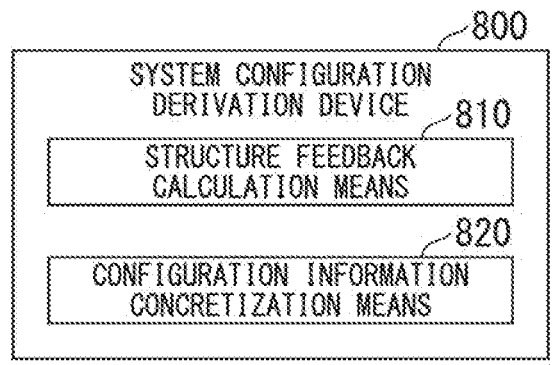
FIG. 19 is a block diagram showing the configuration of a system configuration derivation device with a minimum configuration.

FIG. 19 is a block diagram of the system configuration derivation device with the minimum configuration. A system configuration derivation device 800 is provided with a structure feedback calculation means 801 and a configuration information concretization means 802. When an abstract configuration is intended to represent the configuration of a system containing undetermined portions using a graph structure that includes nodes corresponding to components constituting the system and edges indicating relationships among the components, concretization serves to transform the graph structure such that the undetermined portions of the abstract configuration are determined, and a concrete configuration is one in which all the undetermined portions included in the abstract configuration are determined by the concretization, the structure feedback calculation means 801 takes as input two of the concrete configurations respectively representing the pre-transition system, which is the system before transition, and a candidate of the post-transition system, which is the system after the transition, and outputs a structure feedback function that gives a higher rating to features based on the graph structure possessed by the post-transition system candidate having a lower renewal cost from the pre-transition system to the post-transition system candidate.

The configuration information concretization means 802 takes as input functional requirements to be provided by the post-transition system expressed by the abstract configuration and a primary configuration, which is the concrete configuration expressing the configuration of the pre-transition system, and, by repeating the concretization regarding the functional requirements, searches for the concrete configuration in which the functional requirements are fully made concrete, and derives the concrete configuration with a low renewal cost by using the structure feedback function output by the structure feedback calculation means.

Figure 20:
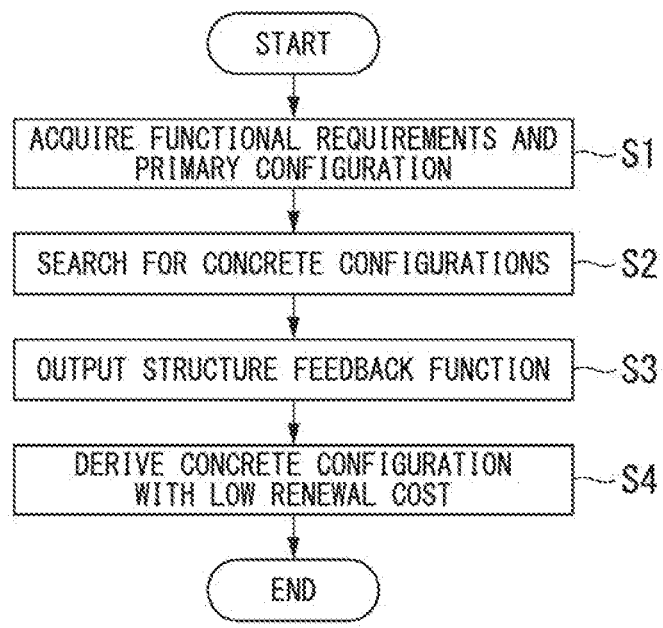
FIG. 20 is a flowchart of the operation of a system configuration derivation device with a minimum configuration.

FIG. 20 is a flowchart diagram showing the operation of a system configuration derivation device with the minimum configuration. The configuration information concretization means 802 acquires the functional requirements that the post-transition system is required to have and the primary configuration, which is the concrete configuration expressing the configuration of the pre-transition system (Step S1). Next, the configuration information concretization means 802 searches for concrete configurations in which the functional requirements are fully concretized by repeating concretization concerning functional requirements based on the primary configuration (Step S2)

Next, the structure feedback calculation means 801 takes the primary configuration (corresponding to the pre-transition system in the claims) and the explored concretized configuration (corresponding to the post-transition system in the claims) as inputs, and outputs a structure feedback function that gives a higher evaluation to the features based on the graph structure possessed by the explored concretized configuration with a lower renewal cost from the primary configuration to the explored embodiment configuration (Step S3). Next, the configuration information concretization means 802 derives a concrete configuration with low renewal cost based on the primary configuration and the explored concrete configuration, using the aforementioned structure feedback function output by the structure feedback calculation means (Step S4).

Some of the system configuration derivation devices 800, 100, and 200 in the embodiments described above may be implemented by a computer. In such a case, it may be realized by recording a program to realize this function on a computer-readable recording medium and having the computer system read and execute the program recorded on this recording medium. The "computer system" here refers to the computer system built into the system configuration derivation devices 800, 100, and 200, and includes an operating system (OS) and hardware such as peripheral devices.

In addition, "computer-readable recording medium" refers to portable media such as flexible disks, optical magnetic disks, ROMs, CD-ROMs, and other storage devices such as hard disks built into computer systems. Furthermore, "computer-readable recording medium" may also include one that holds the program dynamically for a short time, such as a communication line in the case of transmitting the program via a network such as the Internet or a communication line such as a telephone line, and one that holds the program for a fixed period of time, such as volatile memory inside a computer system that serves as the server or client in that case. The above program may be used to realize some of the aforementioned functions, and may also be used to realize the aforementioned functions in combination with programs already recorded in the computer system.

In addition, some or all of the system configuration derivation devices 800, 100, 200 in the embodiments described above may be realized as integrated circuits such as LSI (Large Scale Integration). Each functional part of the system configuration derivation devices 800, 100, and 200 may be individually implemented as an independent processor, or may be partially or fully integrated and implemented as a single processor. The method of circuit integration is not limited to LSI, but may be realized with dedicated circuits or general-purpose processors. If an integrated circuit technology has emerged as an alternative to LSI due to advances in semiconductor technology, an integrated circuit based on such technology may be used.

As mentioned above, techniques are required to derive new configurations with smaller renewal costs for the primary configuration.

According to the present disclosure, for example, new configurations with smaller renewal costs for the primary configuration can be derived.

While preferred embodiments of the disclosure have been described and illustrated above, it should be understood that these are exemplary of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims. Also included are configurations in which elements described in each of the above embodiments and variations and that achieve similar effects are substituted for each other.

What is claimed is:

1. A system configuration derivation device comprising:
   at least one memory configured to store instructions; and
   at least one processor configured to execute the instructions to:
   when an abstract configuration is intended to represent a configuration of a system containing undetermined portions using a graph structure that includes nodes corresponding to components constituting the system and edges indicating relationships among the components, concretization serves to transform the graph structure such that the undetermined portions of the abstract configuration are determined, and a concrete configuration is one in which all the undetermined portions included in the abstract configuration are determined by the concretization,
   take as input two of the concrete configurations respectively representing the pre-transition system, which is the system before transition, and a candidate of the post-transition system, which is the system after the transition, and output a structure feedback function that gives a higher rating to features based on the graph structure possessed by the post-transition system candidate having a lower renewal cost from the pre-transition system to the post-transition system candidate; and
   search for the concrete configuration in which functional requirements are fully made concrete by taking as input the functional requirements to be provided by the post-transition system expressed by the abstract configuration and a primary configuration, which is the concrete configuration expressing the configuration of the pre-transition system, and by repeating the concretization regarding the functional requirements, and derive the concrete configuration with the lowest renewal cost based on the primary configuration and the searched concrete configuration by using the output structure feedback function.

2. The system configuration derivation device according to claim 1,
   wherein the at least one processor is further configured to:
   take as input the two concrete configurations respectively representing the pre-transition system and the post-transition system and calculates the cost of renewal from the pre-transition system to the post-transition system.

3. The system configuration derivation device according to claim 1,
   wherein the at least one processor is further configured to:
   take as input the two concrete configurations respectively representing the pre-transition system and the post-transition system and calculate a renewal procedure from the pre-transition system to the post-transition system, and
   take as input the renewal procedure and a renewal target node that indicates the node to be renewed in the renewal from the pre-migration system to the post-migration system, and calculate an estimate of the renewal cost when the renewal target node no longer requires to be renewed in executing the renewal procedure.

4. The system configuration derivation device according to claim 1,
   wherein the output structure feedback function gives positive feedback when each of the nodes included in the abstract configuration is made concrete in the node that is consistent in terms of settings with the state of the pre-transition system, and gives negative feedback when made concrete in the node not included in the pre-transition system or in the post-transition system.

5. A system configuration derivation method, comprising:
   when an abstract configuration is intended to represent a configuration of a system containing undetermined portions using a graph structure that includes nodes corresponding to components constituting the system and edges indicating relationships among the components, concretization serves to transform the graph structure such that the undetermined portions of the abstract configuration are determined, and a concrete configuration is one in which all the undetermined portions included in the abstract configuration are determined by the concretization,
   outputting a structure feedback function that gives a higher rating to features based on the graph structure possessed by the post-transition system candidate having a lower renewal cost from the pre-transition system to the post-transition system candidate, by taking as input two of the concrete configurations respectively representing the pre-transition system, which is the system before transition, and a candidate of the post-transition system, which is the system after the transition; and
   searching for the concrete configuration in which functional requirements are fully made concrete, by taking as input the functional requirements to be provided by the post-transition system expressed by the abstract configuration and a primary configuration, which is the concrete configuration expressing the configuration of the pre-transition system, and by repeating the concretization regarding the functional requirements, and deriving the concrete configuration with the lowest renewal cost based on the primary configuration and the searched concrete configuration by using the output structure feedback function.

6. A non-transitory computer-readable storage medium that stores a program that causes a computer to processes, the processes comprising:

when an abstract configuration is intended to represent a configuration of a system containing undetermined portions using a graph structure that includes nodes corresponding to components constituting the system and edges indicating relationships among the components, concretization serves to transform the graph structure such that the undetermined portions of the abstract configuration are determined, and a concrete configuration is one in which all the undetermined portions included in the abstract configuration are determined by the concretization, outputting a structure feedback function that gives a higher rating to features based on the graph structure possessed by the post-transition system candidate having a lower renewal cost from the pre-transition system to the post-transition system candidate, by taking as input two of the concrete configurations respectively representing the pre-transition system, which is the system before transition, and a candidate of the post-transition system, which is the system after the transition; and searching for the concrete configuration in which functional requirements are fully made concrete, by taking as input the functional requirements to be provided by the post-transition system expressed by the abstract configuration and a primary configuration, which is the concrete configuration expressing the configuration of the pre-transition system, and by repeating the concretization regarding the functional requirements, and deriving the concrete configuration with the lowest renewal cost based on the primary configuration and the searched concrete configuration by using the output structure feedback function.

* * * * *